(12) United States Patent
Morita et al.

(10) Patent No.: US 11,465,466 B2
(45) Date of Patent: Oct. 11, 2022

(54) TRANSPORTATION SYSTEM

(71) Applicant: TOYOTA JIDOSHA KABUSHIKI KAISHA, Toyota (JP)

(72) Inventors: Makoto Morita, Mishima (JP); Koji Taguchi, Sagamihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 16/113,488

(22) Filed: Aug. 27, 2018

(65) Prior Publication Data

US 2019/0118616 A1 Apr. 25, 2019

(30) Foreign Application Priority Data

Oct. 23, 2017 (JP) .............................. JP2017-204428

(51) Int. Cl.
| | |
|---|---|
| *B60H 1/00* | (2006.01) |
| *G05D 1/00* | (2006.01) |
| *B60L 7/10* | (2006.01) |
| *G06Q 50/30* | (2012.01) |
| *G08G 1/00* | (2006.01) |
| *G06Q 30/02* | (2012.01) |

(52) U.S. Cl.
CPC ..... *B60H 1/00964* (2013.01); *B60H 1/00735* (2013.01); *B60H 1/00778* (2013.01); *B60L 7/10* (2013.01); *G05D 1/0027* (2013.01); *G05D 1/0088* (2013.01); *G06Q 30/0283* (2013.01); *G06Q 50/30* (2013.01); *G08G 1/202* (2013.01)

(58) Field of Classification Search
CPC ............ B60H 1/00964; B60H 1/00778; G05D 1/0027; G05D 1/0088
See application file for complete search history.

(56) References Cited

U.S. PATENT DOCUMENTS

| | | | | |
|---|---|---|---|---|
| 8,341,971 | B2 * | 1/2013 | Oyobe ................... | B60H 1/004 236/1 C |
| 9,547,307 | B1 | 1/2017 | Cullinane et al. | |
| 9,682,609 | B1 * | 6/2017 | Dudar ................ | B60H 1/00785 |
| 10,051,451 | B1 * | 8/2018 | Ray ........................ | H04W 4/90 |
| 2017/0129335 | A1 * | 5/2017 | Lu ........................... | G16H 70/00 |
| 2017/0253201 | A1 * | 9/2017 | Maeshiro ........... | G06K 9/00791 |
| 2017/0282821 | A1 * | 10/2017 | Zych ................. | B60W 50/0098 |
| 2017/0285642 | A1 * | 10/2017 | Rander ............. | G05D 23/1905 |
| 2018/0056903 | A1 * | 3/2018 | Mullett ................ | B60R 16/037 |
| 2018/0060827 | A1 * | 3/2018 | Abbas .................... | G08G 1/202 |

\* cited by examiner

*Primary Examiner* — Jess Whittington
*Assistant Examiner* — Terry C Buse
(74) *Attorney, Agent, or Firm* — Sughrue Mion, PLLC

(57) ABSTRACT

When receiving the transportation request from the user (step S200), the management center extracts the unoccupied vehicle according to the transportation request and selects it as a transportation vehicle (step S201). After selecting the transportation vehicle, the management center transmits to the transportation vehicle the transportation information including the instruction for start-up of air-conditioning (step S202). When receiving the drop-off completion information from the transportation vehicle (step S205), the management center selects the standby area (step S206) and transmits to the transportation vehicle standby information including the instruction for shut-down of air-conditioning (step S207).

2 Claims, 12 Drawing Sheets

TRANSPORTATION SYSTEM

CROSS-REFERENCE TO RELATED APPLICATION

The present disclosure claims priority under 35 U.S.C. § 119 to Japanese Patent Applications No. 2017-204428, filed on Oct. 23, 2017. The contents of these applications are incorporated herein by reference in their entirety.

TECHNICAL FIELD

The present disclosure relates to a system which schedules an autonomous vehicle in response to a transportation request from a user.

BACKGROUND

U.S. Pat. No. 9,547,307 B1 discloses a transportation system in which an autonomous vehicle, a mobile terminal of a user and a server are connected via a network. In this transportation system, when there is a transportation request from the user, the server arranges an unoccupied vehicle which reaches the pickup area specified by the user in the shortest time.

However, if room temperature of the vehicle arriving at the pickup area is too high, or if room temperature is too low, it will make the user uncomfortable. Therefore, it is desirable that room temperature of the vehicle has been adjusted before the pickup to a temperature range being comfortable for the user. However, if an on-board air conditioner is continued to operate during standby, consumption of electricity will be increased accordingly, resulting in a problem that the profitability of the pick-up service deteriorates.

The present disclosure addresses the above described problem, and an object of the present disclosure is, to provide a transportation system which suppresses consumption of power during standby for a transportation request while avoiding room temperature of the vehicle at the pickup from being uncomfortable for the user.

SUMMARY

A first aspect of the present disclosure is a transportation system for solving the problem mentioned above and has the following features.

The transportation system comprises:
a plurality of autonomous vehicles, each of which comprises an air conditioner;
a mobile terminal belonging to a user; and
a management center which communicates via a network to the autonomous vehicles and the mobile terminal.
The management center is configured to:
when receiving a transportation request including a pickup area from the mobile terminal, select an unoccupied vehicle from the autonomous vehicles as a transportation vehicle;
transmit to the transportation vehicle an instruction for transportation based on the transportation request and an instruction for start-up of the air conditioner; and
when receiving from the transportation vehicle a drop-off completion information of the user according to the instruction for transportation, transmit to the transportation vehicle an instruction for shut-down of the air conditioner.

A second aspect of the present disclosure has the following features according to the first aspect.

The management center is further configured to store histories of room temperature of the autonomous vehicles in association with user ID information, The management center is further configured to transmit a target value of room temperature of the transportation vehicle at the transmission of the instruction for start-up.

The target value is set with a history of room temperature in associate with user ID information of source terminal of the transportation request.

A third aspect of the present disclosure has the following features according to the first aspect.

The management center is further configured to obtain environmental information of the pickup area.

The management center is further configured to transmit a target value of room temperature of the transportation vehicle at the transmission of the instruction for start-up.

The target value is set with the environmental information.

A fourth aspect of the present disclosure has the following features according to the first aspect.

The management center is further configured to obtain environmental information of the pickup area and GPS information of the mobile terminal The management center is further configured to transmit a target value of room temperature of the transportation vehicle at the transmission of the instruction for start-up.

The target value is set with the environmental information and the GPS information.

A fifth aspect of the present disclosure has the following features according to the first aspect.

The transportation request includes a desired value of room temperature of the autonomous vehicles.

The management center is further configured to:
store histories of room temperature of the autonomous vehicles in association with user ID information;
obtain environmental information of the pickup area; and
obtain GPS information of the mobile terminal.

The management center is further configured to transmit a target value of room temperature of the transportation vehicle at the transmission of the instruction for start-up.

The target value is set by modifying the desired value with at least one of a history of room temperature in associate with user ID information of source terminal of the transportation request, the environmental information and the GPS information.

A sixth aspect of the present disclosure has the following features according to the first aspect.

The management center is further configured to:
when receiving the transportation request, extract a plurality of candidates of the transportation vehicle; and
transmit a list to source terminal of the transportation request, the list includes information on each of the candidates by combining estimated time at which a candidate of the transportation vehicle reaches the pickup area and estimated room temperature at the pickup area.

A seventh aspect of the present disclosure has the following features according to the sixth aspect.

The management center is further configured to assess each of the candidates with an assessment function whose variables are the estimated time and the estimated room temperature.

In the list, each of the candidates is arranged in descending order of assessment result with the assessment function.

An eighth aspect of the present disclosure has the following features according to the sixth aspect.

The list further includes information on basic charge for the estimated room temperature.

The management center is further configured to set the basic charge to be a lower price as a difference in temperature between the estimated room temperature and a predetermined temperature range becomes small and set the basic charge to be a higher price as the difference becomes large.

In the list, each of the candidates is arranged in order of early of the estimated time or in ascending order of the basic charge.

A ninth aspect of the present disclosure has the following features according to the sixth aspect.

The transportation request includes a target value of room temperature of the transportation vehicle.

The list further includes basic charge for the estimated room temperature.

The management center is further configured to set the basic charge to be a lower price as a difference in temperature between the estimated room temperature and the target value becomes small and set the basic charge to be a higher price as the difference becomes large.

In the list, each of the candidates is arranged in order of early of the estimated time or in ascending order of the basic charge.

A tenth aspect of the present disclosure has the following features according to the first aspect.

The management center is further configured to, at the transmission of the instruction for start-up, transmit a target value of room temperature of the transportation vehicle and start-up time of the air conditioner.

The start-up time is set by subtracting a required time for adjusting room temperature of the transportation vehicle to the target value from estimated time at which the transportation vehicle reaches the pickup area.

An eleventh aspect of the present disclosure has the following features according to the first aspect.

The management center is further configured to store histories of pickup areas.

The management center is further configured to:
specify, with the histories of pickup areas, a high-needs area where there was a lot of transportation requests;
select, as a hypothetical transportation vehicle, an unoccupied vehicle from the autonomous vehicles based on a hypothetical transportation request in which the high-needs area is set to a hypothetical pickup area;
transmit to the hypothetical transportation vehicle an instruction for hypothetical transportation based on the hypothetical transportation request and the instruction for start-up; and
after receiving, from the hypothetical transportation vehicle, arrival information to the hypothetical pickup area according to the instruction for hypothetical transportation, transmit to the hypothetical transportation vehicle the instruction for shut-down.

A twelfth aspect of the present disclosure has the following features according to the eleventh aspect.

The management center is further configured to:
when receiving the arrival information to the hypothetical pickup area, select a standby area of the hypothetical transportation vehicle;
transmit to the hypothetical transportation vehicle an instruction for standby including a standby area; and
when receiving, from the hypothetical transportation vehicle, the arrival information to the standby area, transmit the instruction for shut-down.

A thirteenth aspect of the present disclosure has the following features according to the eleventh aspect.

Each of the autonomous vehicles comprises:
a battery which is configured to supply drive power to the air conditioner; and
a generator which is configured to charge regenerative energy to the battery during decelerating travel of an autonomous vehicle to which the battery is mounted.

The management center is further configured to, at the transmission of the instruction for start-up to the hypothetical transportation vehicle, transmit a start-up condition of the air conditioner.

The start-up condition is that the hypothetical transportation vehicle is in the decelerating travel.

A fourteenth aspect of the present disclosure has the following features according to the first aspect.

The management center is further configured to store histories of the pickup areas.

The management center is further configured to:
specify, with the histories of pickup areas, a high-needs area where there was a lot of transportation requests;
when a standby area of the unoccupied vehicle correspond to the high-needs area, determine whether or not room temperature of the unoccupied vehicle is higher than a predetermined temperature range and whether or not the standby area is sunny area;
when determining that room temperature of the unoccupied vehicle is higher than the predetermined temperature range and also the standby area is sunny area, select shadow area as a new standby area;
when determining that room temperature of the unoccupied vehicle is not higher than the predetermined temperature range and also the standby area is not sunny area, select shadow area as a new standby area, select sunny area as a new standby area; and
transmit a new instruction for standby including the new standby area to the unoccupied vehicle.

According to the first aspect, when receiving the transportation request, the management center transmits to the transportation vehicle the instruction for transportation based on the transportation request and the instruction for set-up of the air conditioner. When receiving the instruction for start-up, the transportation vehicle starts the air conditioner accordingly. Therefore, it is possible to avoid room temperature at the pickup from being uncomfortable temperature for the user. Further, according to the first aspect, when receiving drop-off completion information, the management center transmits to the transportation vehicle the instruction for shut-down of the air conditioner. When receiving the instruction for shut-down, the stops the operation of air conditioner accordingly. Therefore, it is also possible to suppress consumption of power during standby for another transportation request.

According to the second aspect, the target value of room temperature is transmitted at the transmission of the instruction for start-up. The target value is set with a history of room temperature in associate with user ID information of source terminal of the transportation request. Therefore, it is possible to adjust room temperature of the transportation vehicle to preferable temperature of the user to whom the source terminal of the transportation request belongs.

According to the third aspect, the target vale of room temperature is transmitted at the transmission of the instruction for start-up. The target value is set with environmental information of the pickup area. Therefore, it is possible to adjust room temperature of the transportation vehicle to comfortable temperature for the user to whom the source terminal of the transportation request belongs.

According to the fourth aspect, the target vale of room temperature is transmitted at the transmission of the instruction for start-up. The target value is set with environmental information of the pickup area and GPS information of the mobile terminal. Therefore, it is possible to adjust room temperature of the transportation vehicle to more comfortable temperature for the user to whom the source terminal of the transportation request belongs.

According to the fifth aspect, the target vale of room temperature is transmitted at the transmission of the instruction for start-up. The target value is set by modifying the desired value with at least one of a history of room temperature in associate with user ID information of source terminal of the transportation request, the environmental information and the GPS information. Therefore, it is possible to adjust room temperature of the transportation vehicle to more comfortable temperature for the user to whom the source terminal of the transportation request belongs.

According to the sixth aspect, the list including information on each of the candidates which is obtained by combining the estimated arrival time and estimated room temperature at the pickup area is transmitted to the source terminal of the transportation request. Therefore, it is possible for the user, to whom the source terminal of the transportation request belongs, to select from the list a transportation vehicle in accordance with one's preference.

According to the seventh aspect, each of the candidates is assessed with the assessment function and is arranged in descending order of assessment result. Therefore, it is possible to increase options of the user to whom the source terminal of the transportation request belongs.

According to the eighth aspect, the basic charge and the estimated arrival time are arranged in order of early of the estimated arrival time or in ascending order of the basic charge. The basic charge is set to be a lower price as the difference in temperature between the estimated room temperature and the predetermined temperature range becomes small and a higher price as the difference becomes large. Therefore, it is possible to increase options of the user to whom the source terminal of the transportation request belongs.

According to the ninth aspect, the basic charge and the estimated arrival time are arranged in order of early of the estimated arrival time or in ascending order of the basic charge. The basic charge is set to be a lower price as the difference in temperature between the estimated room temperature and the target value becomes small and a higher price as the difference becomes large. Therefore, even when the target value is set, it is possible to increase options of the user to whom the source terminal of the transportation request belongs.

According to the tenth aspect, the start-up time is set by subtracting the required time for adjusting room temperature of the transportation vehicle to the target value from the estimated arrival time. Therefore, it is possible to suppress consumption of power by shortening the operation time of the air conditioner while reliably adjusting room temperature of the vehicle.

According to the eleventh aspect, the hypothetical transportation vehicle is arranged based on the hypothetical transportation request in which the high-needs area is set to the hypothetical pickup area. Therefore, it is possible to quickly respond to near future transportation request in the high-needs area. Further, according to the eleventh aspect, when receiving the hypothetical transportation request, the management center transmits to the hypothetical transportation vehicle the instruction for hypothetical transportation based on the hypothetical transportation request and the instruction for start-up. Therefore, it is possible to avoid room temperature at the pickup in the near future from being uncomfortable temperature for the user. Further, according to the eleventh aspect, after receiving arrival information to the hypothetical pickup area from the hypothetical transportation vehicle, the management center transmits to the hypothetical transportation vehicle the instruction for shut-down. Therefore, it is possible to suppress consumption of power due to the hypothetical transportation request.

According to the twelfth aspect, when receiving arrival information to the standby area, the management center transmits the instruction for shut-down to the hypothetical transportation vehicle. Therefore, it is possible to suppress consumption of power based on the hypothetical transportation request.

According to the thirteenth aspect, the start-up condition of the air conditioner is additionally transmitted at the transmission of the instruction for start-up to the hypothetical transportation vehicle. The start-up condition is that the hypothetical transportation vehicle is in the decelerating travel. Here, the arrangement of the hypothetical transportation vehicle based on the hypothetical transportation request has the risk of resulting in a missed swing. In this regard, the battery is charged with regenerative energy during the decelerating travel. Therefore, it is possible to suppress consumption of power based on the hypothetical transportation request.

According to the fourteenth aspect, it is determined as to room temperature of the unoccupied vehicle of which the standby area corresponds to the high-needs area and sunshine condition, and the new standby area (shadow area or sunny area) is set according to the determination result. Therefore, it is possible to keep room temperature of the unoccupied vehicle within the predetermined temperature range.

DESCRIPTION OF EMBODIMENTS

Figure 1:
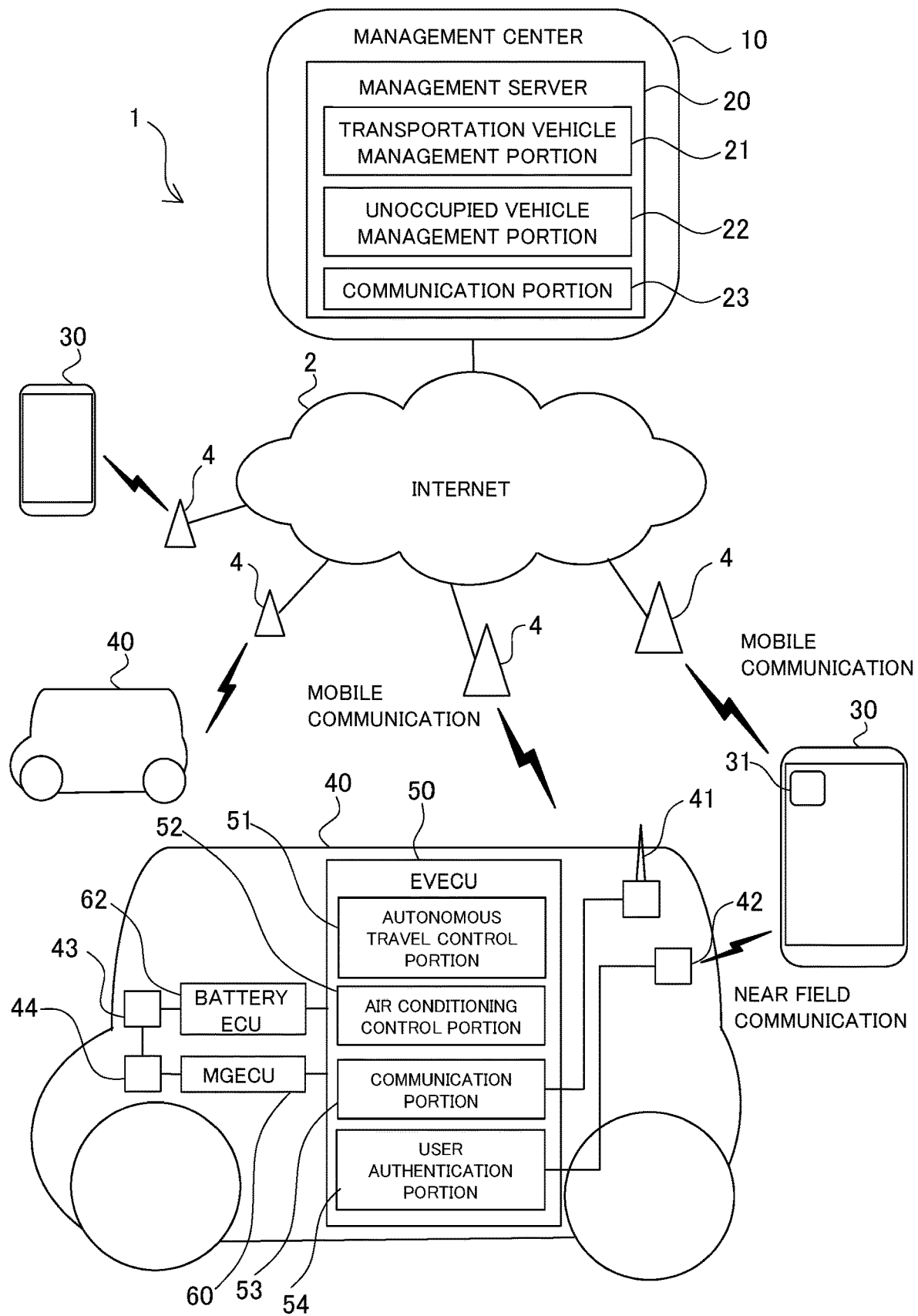
FIG. 1 is a diagram for showing a configuration of a transportation system according to each embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

1. Configuration of a Transportation System

A transportation system according to a first embodiment of the present disclosure is a system in which an autonomous vehicles are used to realize a transportation service. FIG. 1 is a diagram for showing a configuration of a transportation system according to the first embodiment. Note that the configuration of a transportation system 1 shown in FIG. 1 is common not only to the first embodiment but also to second to seventh embodiments described later.

The transportation system 1 shown in FIG. 1 comprises autonomous vehicles (hereinafter also simply referred to as a "vehicle" or "vehicles") 40, a mobile terminal 30 owned by a user and a management center 10 which communicates the vehicles 40 and the mobile terminal via a network (i.e. internet) 2. The number of the vehicles 40 constituting the transportation system 1 is at least two.

The management center 10 is a facility operated by a provider that provides the transportation service. However, it is unnecessary for the provider to be resident in the management center 10 and a management server 20. That is, it is sufficient at least a management server 20 is installed in the management center 10. The management server 20 itself may be the management center 10. The management server 20 is a computer having at least one processor and at least one memory. In the memory, at least one program for the transportation service and various data are stored. When the program stored in the memory is read out and executed by the processor, the management server 20 implements various functions represented by blocks in FIG. 1.

The management server 20 is provided with a large-capacity storage device such as HDD and SSD. Various databases are built in the storage device. Various databases include a database for storing information on users who use the transportation service, a database for storing map information on areas providing transportation services, road traffic information and environmental information (for example, weather, temperature, humidity), and a database for storing status information of the vehicles 40. The status information of the vehicles 40 includes not only travel information (for example, running area, diagnosis) but also service engaging states (for example, service underway and service standby), room temperature and battery information (for example, SOC (State Of Charge)). The management server 20 may be composed of a plurality of computers.

The management server 20 is connected to the network 2. The management server 20 is configured to communicate with the vehicles 40 via the network 2. The management server 20 is also configured to communicate with the user's mobile terminal 30 via the network 2. In FIG. 1, the function for the transportation service of the management server 20 is represented by a plurality of blocks. The blocks correspond to a transportation vehicle management portion 21, an unoccupied vehicle management portion 22 and a communication portion 23.

The transportation vehicle management portion 21 is configured to execute processing to accept a transportation request (hereinafter also referred to as "(A) Reception processing"), processing to select a transportation vehicle (hereinafter also referred to as "(B) Selection processing") and processing to generate transportation information (hereinafter also referred to as "(C) Generation processing").

(A) Reception processing is processing to accept a transportation request transmitted from the mobile terminal 30 of the user via the network 2. The transportation request accepted by (A) Reception processing includes, for example, the following information on (i) to (v).

(i) user's personal identification information (i.e. user ID information)
(ii) pickup area at which the user wishes to ride
(iii) drop-off area at which the user wishes to drop off
(iv) number of prospective riders
(v) pickup time during which the user wishes to ride The information on (ii) pickup area may be present area of the mobile terminal 30 specified from the GPS information of the mobile terminal 30. Also, (iii) drop-off area may not be included in the transportation request. In this case, the user may specify (iii) drop-off area from after sending the transportation request and before pickup, or the user may specify (iii) drop-off area after pickup.

(B) Selection processing is processing to select a transportation vehicle based on the transportation request and information stored in the database of the management server 20. In (B) Selection processing, at first, an unoccupied vehicle which is able to reach (ii) pickup area by (v) pickup time and also has the shortest autonomous travel time of route to (ii) pickup area is extracted. The autonomous travel time is calculated under an assumption that the unoccupied vehicle normally travels the route from its present area to (ii) pickup area. Subsequently, it is determined whether or not capacity of the extracted vehicle is less than (iv) number of prospective riders. When it is determined that the capacity is larger than (iv) number of prospective riders, the extracted vehicle is selected as the transportation vehicle. When it is determined that the capacity is less than (iv) number of prospective riders, the unoccupied vehicle which is able to reach (ii) pickup area by (v) pickup time and also has the second shortest autonomous travel time of route to (ii) pickup area is extracted. Then the determination on the capacity of the newly extracted vehicle is executed. By repeating the extraction of the unoccupied vehicle and the determination on the capacity of the extracted vehicle, the transportation vehicle is selected.

(C) Generation processing is processing to generate transportation information for transmission to the transportation vehicle and the mobile terminal 30. Transportation information for the transportation vehicle includes instructions for transportation and for air-conditioning. The instruction for transportation includes, for example, (i) user ID information and (ii) pickup area. The instruction for air-conditioning included in the transportation information is, for example, the instruction for start-up of the air conditioner (hereinafter also referred to as an "instruction for start-up of air-conditioning"). Transportation information for the mobile terminal 30 includes, for example, ID information of the selected transportation vehicle and estimated times at which the same vehicle reaches (ii) pickup area and (iii) drop-off area, respectively. The estimated time to reach (ii) pickup area is calculated under an assumption that the transportation vehicle normally travels from its present area to (ii) pickup area. The estimated time to reach (iii) drop-off area is calculated under an assumption that the transportation vehicle normally travels from (ii) pickup area to (iii) drop-off area.

The unoccupied vehicle management portion 22 is configured to execute processing to select a standby area of the unoccupied vehicle (hereinafter also referred to as "(D) Selection processing") and processing to generate standby information to be transmitted to the unoccupied vehicle (hereinafter also referred to as "(E) Generation processing").

(D) Selection processing is processing to electing an area where the unoccupied vehicle waits for a transportation request based on information stored in the database of the management server 20. In (D) Selection processing, at first, standby areas at which the vehicles 40 able to stop are extracted. Subsequently, a standby area is extracted from the extracted areas where autonomous travel time of the route from present area of the unoccupied vehicle is the shortest. Depending on the status information of the unoccupied vehicle, a management station may be selected as the standby area. The management station is a facility scattered within an offering area of the transportation service. The management station is equipped with a charging device, an equipment for maintenance and inspection etc. For example, when it is determined that charging to the battery 44 described later is necessary or when it is determined that maintenance and inspection of the vehicle 40 is necessary, a management station where the unoccupied vehicle is able to reach in the shortest time is set to the standby area (usually the nearest management station).

(E) Generation processing is processing to generating standby information for the unoccupied vehicle. The standby information includes an instruction for preparing standby mode, an instruction for transferring standby mode, and an instruction for air-conditioning. The instruction for preparing standby mode is transmitted to the unoccupied vehicle which have completed to drop off the user at (iii) drop-off area. The instruction for preparing standby mode includes, for example, the standby area. The instruction for transferring standby mode is transmitted to the unoccupied vehicle which has moved to the standby area. The instruction for air-conditioning is transmitted to the unoccupied vehicle which has dropped off the user. The instruction for air-conditioning is, for example, an instruction for shut-down of the air conditioner (hereinafter also referred to as an "instruction for shut-down of air-conditioning"). The instruction for shut-down of air-conditioning may be transmitted to the unoccupied vehicle that has moved to the standby area, not to the unoccupied vehicle which has dropped off the user.

The communication portion 23 is configured to transmit the transportation information to the vehicles 40 and the mobile terminal 30 via the network 2. The communication portion 23 is also configured to transmit the standby information to the unoccupied vehicle.

The mobile terminal 30 is a wireless communication terminal capable of wireless communication with the base stations 4 on the network 2, for example, a smartphone. The communication standard of the wireless communication used by the mobile terminal 30 may be a mobile communication standard such as 4G, LTE, 5G, or the like. In the mobile terminal 30, an application 31 for the transportation service is installed. When the user starts up the application 31, it is possible for the user to connect to transmit the transportation request to the management center 10.

The mobile terminal 30 preferably includes a chip (not shown) of Near Field Communication such as Wi-Fi, Bluetooth (registered trademark) or the like. Near Field Communication is used for authentication between the mobile terminal 30 and the vehicles 40. However, if different means are used for the authentication, the function of Near Field Communication is not required.

Each of the vehicles 40 is configured to travel autonomously a route from its present area to a destination based on the transportation information, the standby information or the various information described above. Various information for autonomous travel includes external information for recognizing external conditions of the vehicle 40 obtained by external sensors such as camera sensor and millimeter wave sensor. The various information for autonomous travel includes internal information for recognizing the state of the vehicle 40 obtained by internal sensors such as a vehicle speed sensor and an acceleration sensor. The various information for autonomous travel includes GPS information indicating the present area obtained by a GPS receiver. The various information for autonomous travel includes map information stored in the map database.

Each of the vehicles 40 includes a communication device for network 41, a communication device for authentication 42, a motor/generator (hereinafter also referred to as a "MG") 43 and a battery 44. The communication device for network 41 and the communication device for authentication 42 are connected to an electronic vehicle electronic control unit (hereinafter also referred to as an "EVECU") 50. The EVECU 50 has at least one processor and at least one memory. In the memory, at least one program for autonomous travel and various data are stored. When the program stored in the memory is read out and executed by the processor, the EVECU 50 implements various functions represented by blocks in FIG. 1. The EVECU 50 may be composed of a plurality of ECUs.

The MG 43 is composed of, for example, a synchronous generator motor. The MG 43 is connected to the battery 44 via a power line provided with an inverter. The MG 43 is also connected to an electronic control unit for motor/generator (hereinafter also referred to as a "MGECU") 60. The MGECU 60 has at least one processor and at least one memory. In the memory, at least one program for drive control of the MG 43 is stored. The drive control of the MG 43 includes control for causing the vehicle 40 to travel, and control for regenerating during deceleration of the vehicle 40.

The battery 44 is composed of, for example, a lithium ion secondary battery or a nickel hydrogen rechargeable battery. The battery 44 is connected to a battery electronic control unit (hereinafter also referred to as a "battery ECU") 62. The battery ECU 62 has at least one processor and at least one memory. In the memory, at least one program for managing the battery 44 is stored. When the program stored in the memory is read and executed by the processor, data on the state of the battery 44 is output to the EVECU 50. The data on the state of the battery 44 includes the SOC. The SOC is defined as the ratio of capacity of dischargeable power of the battery 44 to a total capacity of the battery 44.

In FIG. 1, among the functions for the autonomous travel of the EVECU 50, the functions related to the transportation service are represented by a plurality of blocks. The blocks correspond to an autonomous travel control portion 51, an air conditioning control portion 52, a communication portion 53 and a user authentication portion 54. The autonomous travel based on the above various information is realized by the autonomous travel control portion 51. For example, the autonomous travel control portion 51 calculates a traveling route based on the above-described transportation information or standby information, the GPS information of the vehicle 40, and map information. The autonomous travel control portion 51 controls driving, steering and braking of the vehicle 40 so that the vehicle 40 autonomously travels along the calculated traveling route. There are various known methods for the autonomous travel, and in the present disclosure there is no limitation on the method for the autonomous travel. The autonomous travel control portion 51 takes roles on the autonomous travel of the route from the present area to (ii) pickup area, the pickup of the user at (ii) pickup area, the drop-off of the user at (iii) drop-off area, and the autonomous travel of the route form the (iii) drop-off area to the standby area.

The air conditioning control portion 52 is configured to control driving of the air conditioner based on the transportation information (more concretely, the instruction for start-up of air-conditioning or shut-down of air-conditioning). The air conditioner is, for example, a known cooling and heating device including a cooling system having an electric compressor, a condenser, a heat exchanger and the like and an a heater system having a heater core, an electric water pump, an electric heater and the like. When the air conditioner performs a cooling operation, the air conditioning control portion 52 drives the electric compressor whereas stops driving the electric water pump and the electric heater. When the air conditioner performs a heating operation, the air conditioning control portion 52 drives the electric water pump and the electric heater whereas stops driving the electric compressor.

The communication portion 53 is configured to connect to the network 2 with the communication device for network 41. Specifically, wireless communication is performed between the communication device for network 41 and nearest base station 4, and the communication device for network 41 is connected to the network 2 via the nearest base station 4. The communication standard of the wireless communication used by the communication device for network 41 may be a mobile communication standard such as 4G, LTE, 5G, or the like. On the network 2, a connection destination of the communication portion 53 is the communication portion 23 of the management server 20. From the communication portion 53 to the communication portion 23, for example, external information obtained by the external sensors, internal information acquired by the internal sensors, and GPS information obtained by the GPS receiver are transmitted. From the communication portion 23 to the communication portion 53, for example, the instruction for transportation, the instruction for transferring standby mode, and the instruction for air-conditioning are transmitted.

The user authentication portion 54 is configured to communicate wirelessly with the mobile terminal 30 with the communication device for authentication 42. The communication standard used by the communication device for authentication 42 may be a standard capable of wireless communication at a short distance such as Wi-Fi, Bluetooth (registered trademark) or the like. The user authentication portion 54 performs Near Field Communication with the mobile terminal 30 located in the vicinity of the vehicle 40 and directly obtains ID information (for example, a PIN code) of the mobile terminal 30. Then, the user authentication portion 54 compares the obtained ID information with (i) user ID information obtained from the management server 20 by Near Field Communication. If the two information match, the user authentication portion 54 authenticates the user of the mobile terminal 30 as a source terminal of the transportation request. The user authentication performed by the user authentication portion 54 is used as, for example, conditions of the door lock release of the vehicle 40 at (ii) pickup area.

2. Example of Flow of the Transportation Service

Figure 2:
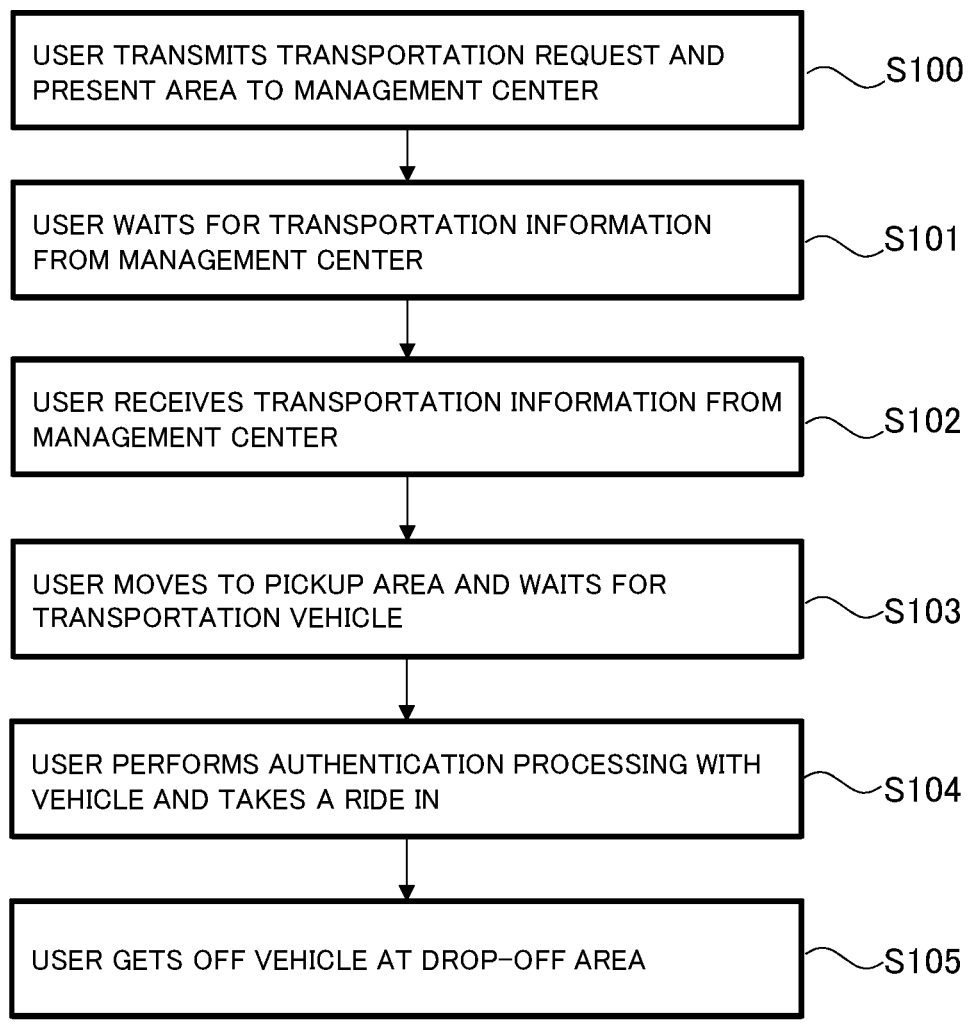
FIG. 2 is a flowchart for showing a flow of processing in a mobile terminal (a user) constituting the transportation system according to a first embodiment of the present disclosure.
Figure 3:
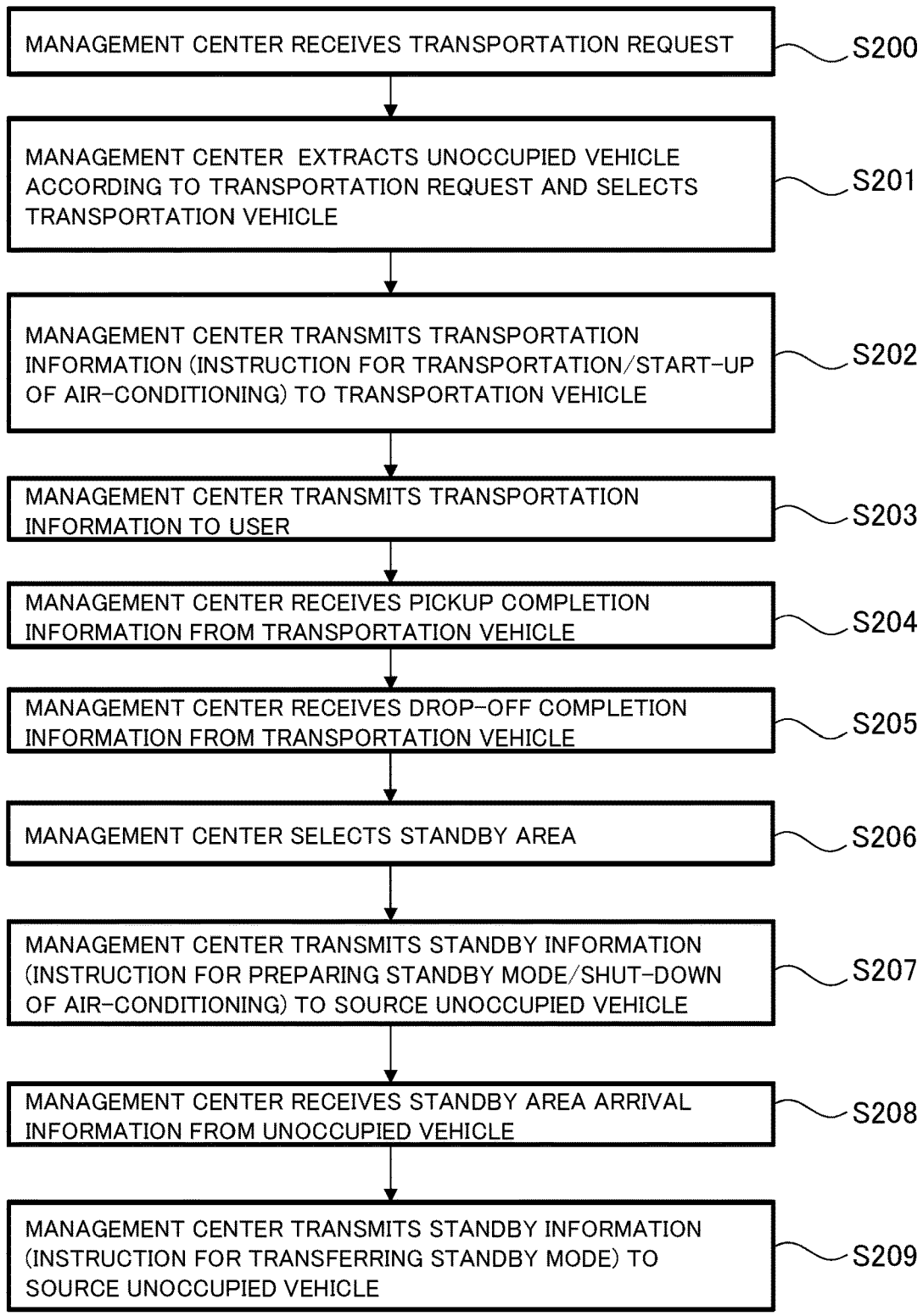
FIG. 3 is a flowchart for showing a flow of processing in a management center (a management server) constituting the transportation system according to the first embodiment.
Figure 4:
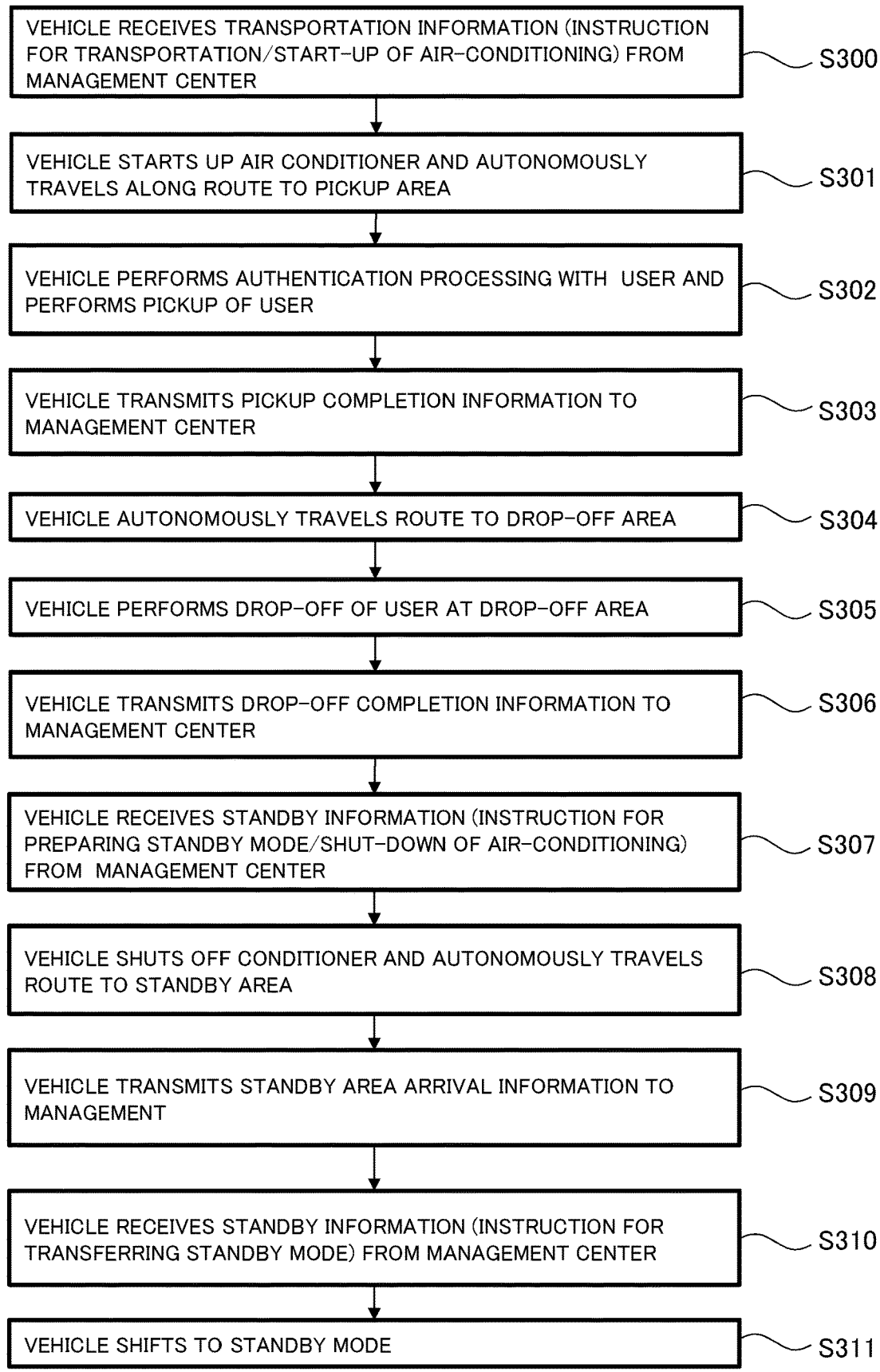
FIG. 4 is a flowchart for showing a flow of processing in a vehicle constituting the transportation system according to first embodiment.

An example of a processing flow of the transportation service according to the first embodiment will be described with reference to FIGS. 2 to 4. FIG. 2 is a flowchart for showing a flow of processing in the mobile terminal 30 (the user) constituting the transportation system 1. FIG. 3 is a flowchart for showing a flow of processing in the management center 10 (the management server 20) constituting the transportation system 1. FIG. 4 is a flowchart for showing a flow of processing in the vehicle 40 constituting the transportation system 1.

The processing of the transportation system shown in FIGS. 2 to 4 is started when the user starts up the application 31 to transmit the transportation request to the management center 10. As shown in FIG. 2, the user transmits the transportation request and present area to the management center 10 (step S100), and waits for transportation information from the management center 10 (step S101). The present area transmitted in step S100 is specified from GPS information of the mobile terminal 30. The transportation request transmitted in step S100 includes the above information (i) to (v).

When the management center 10 receives the transportation request, the processing shown in FIG. 3 is started. As shown in FIG. 3, when the management center 10 receives the transportation request from the user (step S200), it extracts the unoccupied vehicle according to the transportation request and selects it as a transportation vehicle (step S201). In the selection processing of the transportation vehicle in step S201, the transportation request and information stored in the database of the management server 20 are used. After selecting the transportation vehicle, the management center 10 transmits transportation information (the instruction for transportation and the instruction for start-up of air-conditioning) to the transportation vehicle (step S202). In addition, the management center 10 transmits transportation information (such as ID information of the transportation vehicle) to the user (step S203). Thereafter, the management center 10 receives pickup completion information from the transportation vehicle (step S204).

When the mobile terminal 30 and the vehicle 40 receive the transportation information, the processing from step S102 in FIG. 2 and the processing from step S300 in FIG. 4 are started. As shown in FIG. 2, when the user receives transportation information (transportation vehicle ID information, etc.) from the management center 10 (step S102), the user moves to the pickup area and waits for the transportation vehicle (step S103). Also, as shown in FIG. 4, when the vehicle 40 (the transportation vehicle) receives transportation information (the instruction for transportation and the instruction for start-up of air-conditioning) from the management center 10 (step S300), it starts up the air conditioner and autonomously travels along the route to the pickup area (step S301).

At the pickup area, when authentication processing is performed between the user and the vehicle 40 (the transportation vehicle), it is possible to get on the vehicle 40 (the transportation vehicle). As shown in FIG. 2, the user performs authentication processing with the vehicle 40 (the transportation vehicle) and takes a ride in (step S104). Also, as shown in FIG. 4, the vehicle 40 (the transportation vehicle) performs authentication processing with the user and performs pickup of the user (step S302). After completion of the pickup, the vehicle 40 (the transportation vehicle) transmits pickup completion information to the management center 10 (step S303) and then autonomously travels the route to the drop-off area (step S304).

At the drop-off area, when the user gets off the vehicle 40 (the transportation vehicle), the processing of step S105 in FIG. 2, and the processing from step S305 in FIG. 4 are started. As shown in FIG. 2, the user gets off the vehicle 40 (the transportation vehicle) at the drop-off area (step S105). Also, as shown in FIG. 4, the vehicle 40 (the transportation vehicle) performs drop-off of the user at the drop-off area (step S305). After completion of the drop-off, the vehicle 40 (the transportation vehicle) transmits drop-off completion information to the management center 10 (step S306).

When the management center 10 receives the drop-off completion information, the vehicle 40 is handled as the unoccupied vehicle at the management center 10, and the processing from step S205 in FIG. 3 is started. As shown in FIG. 3, when the management center 10 receives the drop-off completion information from the vehicle 40 (the transportation vehicle) (step S205), the management center 10 selects the standby area (step S206) and transmits the standby information (the instructions for preparing standby mode and shut-down of air-conditioning) to the vehicle 40 (the unoccupied vehicle) as a source unoccupied vehicle which has transmitted the drop-off completion information (step S207).

When the vehicle 40 (the unoccupied vehicle) receives the standby information (the instructions for preparing standby mode and shut-down of air-conditioning), the processing from step S307 in FIG. 4 is started. As shown in FIG. 4, when the vehicle 40 (the unoccupied vehicle) receives the standby information (the instructions for preparing standby mode and shut-down of air-conditioning) from the management center 10 (step S307), the vehicle shuts down the conditioner and autonomously travels the route to the standby area (step S308). When arriving at the standby area, the vehicle 40 (the unoccupied vehicle) transmits standby area arrival information to the management center 10 (step S309).

When the management center 10 receives the standby area arrival information, the processing from step S208 in FIG. 3 is started. As shown in FIG. 3, when the management center 10 receives the standby area arrival information from the vehicle 40 (the unoccupied vehicle) (step S208), the management center 10 transmits the standby information (the instruction for transferring standby mode) to the vehicle 40 (the unoccupied vehicle) as a source unoccupied vehicle which has transmitted the standby area arrival information (step S209).

When the vehicle 40 (the unoccupied vehicle) receives the standby information (the instruction for transferring standby mode), the processing starting from step S310 in FIG. 4 is started. As shown in FIG. 4, when receiving the standby information (the instruction for transferring standby mode) from the management center 10 (step S310), the vehicle 40 (the unoccupied vehicle) shifts to the standby mode (step S311).

3. Effects According to the Transportation System

In the transportation system according to the first embodiment described above, the instruction for start-up of air-conditioning is included in the transportation information transmitted to the transportation vehicle. Also, the instruction for shut-down of air-conditioning is included in the standby information transmitted to the unoccupied vehicle which has dropped off the user. Therefore, the air conditioner is turned on while the vehicle 40 is treated as the transportation vehicle, it is turned off while the vehicle 40 is treated as the unoccupied vehicle. That is, the air conditioner is turned on only while the transportation service is performed. Therefore, it is possible to avoid room temperature of the transportation vehicle at the pickup from being uncomfortable temperature for the user while suppressing the consumption of power in the battery 44.

Second Embodiment

1. Characteristic of a Second Embodiment of the Present Disclosure

In the transportation system according to the first embodiment described above, the transportation information transmitted to the transportation vehicle includes the instruction for transportation and the instruction for start-up of air-conditioning. In the second embodiment 2, a target value of room temperature (hereinafter also referred to as a "target temperature") is added to this transportation information.

In the second embodiment, the transportation request accepted by the transportation vehicle management portion 21 includes information on (vi) room temperature desired by the user (hereinafter also referred to as "desired room temperature") in addition to the above information on (i) to (v). When information on (vi) desired room temperature is included in the transportation request, the transportation vehicle management portion 21 is configured to add information on (vi) desired room temperature as the target temperature to the transportation information to be transmitted to the transportation vehicle.

Note that, however, information on (vi) desired room temperature may be not included in the transportation request. When information on (vi) desired room temperature is not included in the transportation request, the transportation vehicle management portion 21 is configured to set uniquely (vi) desired room temperature. For example, the transportation vehicle management portion 21 sets a default value (a design value) as the target temperature.

The transportation vehicle management portion 21 may be configured to set the target temperature other than the above default value based on information stored in the database of the management server 20. The stored information used for setting the target temperature is, for example, histories of room temperature of the vehicles 40. The above default value is only a design value and there are cases where it is greatly different from the user's preferable temperature. In this respect, for example, when histories of room temperature of the transportation vehicle are stored in the database in association with the user ID information, it is possible to set an appropriate target temperature based on (i) user ID information included in the transportation request and the histories (for example, average room temperature during the transportation service). Therefore, even if (vi) desired room temperature is not included in the transportation request, it is possible to adjust room temperature of the transportation vehicle to the user's preferable temperature of the source terminal of the transportation request.

Another stored information used for setting the target temperature is, for example, environmental information of (ii) pickup area. For example, if the outer temperature of (ii) pickup area is higher than a predetermined suitable temperature range, the transportation vehicle management portion 21 sets the target temperature to a low temperature. The histories of room temperature is accumulated in the database unless the user uses the transportation service at least once. In this respect, when using the environmental information of (ii) pickup area, it is possible to adjust room temperature of the transportation vehicle to a comfortable temperature for the user who uses the transportation service for the first time.

The environmental information at (ii) pickup area may be combine with GPS information of the mobile terminal 30. The GPS information of the mobile terminal 30 is transmitted to the management server 20 as well as the transportation request. When the GPS information of the mobile terminal 30 is used, it is possible to estimate whether the present area of the mobile terminal 30 is indoors or not. For example, when the temperature of (ii) pickup area is high and also it is presumed that the present area is outdoors, the target temperature is set to a relative low temperature. By combining the estimation result of present area with the environmental information of (ii) pickup area, it is possible to adjust room temperature of the transportation vehicle to a more comfortable temperature for the user who uses the transportation service for the first time.

The target temperature may be set by modifying (vi) desired room temperature included in the transportation request with at least one of the histories of room temperature of the transportation vehicles, the environmental information on (ii) pickup area and the GPS information of the mobile terminal 30. When such a modification is performed on (vi) desired room temperature, it is possible to adjust room temperature of the transportation vehicle to more comfortable temperature for the user.

When the transportation information includes the target temperature, the air conditioning control portion 52 may execute feedforward control of the air conditioner based on room temperature of the transportation vehicle and the target temperature. The air conditioning control portion 52 may execute feedback control of the air conditioner so that room temperature of the transportation vehicle matches the target temperature.

2. Example of Flow of the Transportation Service

Figure 5:
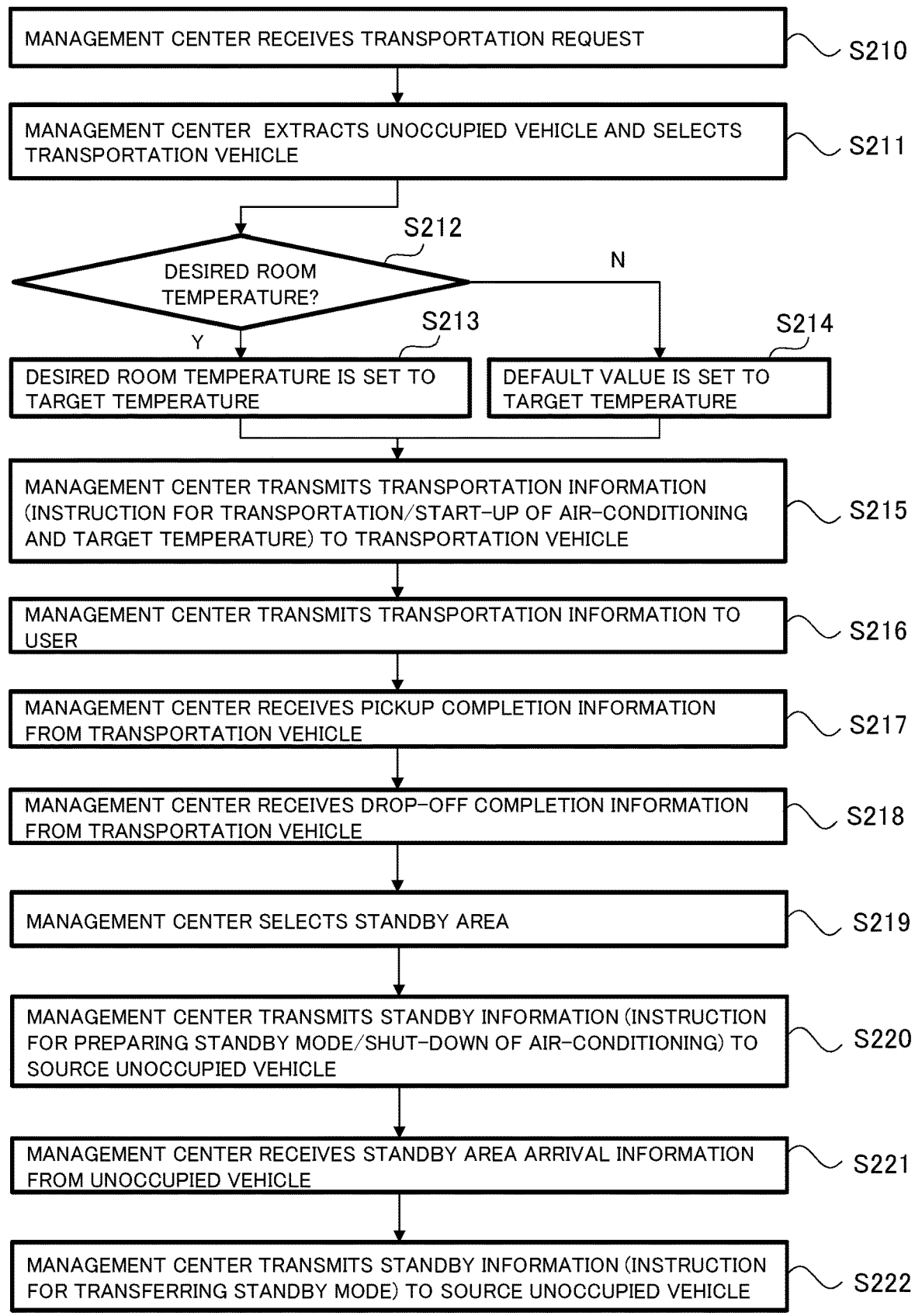
FIG. 5 is a flowchart for showing a flow of processing in the management center (the management server) constituting the transportation system according to a second embodiment of the present disclosure.

An example of a processing flow of the transportation service according to the second embodiment will be described with reference to FIG. 5. FIG. 5 is a flowchart for showing a flow of processing in the management center 10 (the management server 20) constituting the transportation system 1 according to the second embodiment. Note that the flow of processing in the mobile terminal 30 (the user) is basically the same as the flow described in FIG. 2, and the flow of processing in the vehicle 40 is basically the same as the flow described in FIG. 4.

When the management center 10 receives the transportation request, the processing shown in FIG. 5 is started. As shown in FIG. 5, when receiving the transportation request from the user (step S210), the management center 10 extracts the unoccupied vehicle according to the transportation request and selects it as the transportation vehicle (step S211). The processing in steps S210 and S211 is the same as the processing in steps S200 and S201 shown in FIG. 3.

Subsequent to step S211, the management center 10 determines whether there is an input of the desired room temperature (step S212). This determination is executed by judging whether (vi) desired room temperature is included in the transportation request or not. When it is determined that there is the input of the desired room temperature, the management center 10 sets (iv) desired room temperature to the target temperature (step S213). When it is determined that there is no input of the desired room temperature, the management center 10 sets the default value to the target temperature (step S214).

After setting the target temperature, the management center 10 transmits the transportation information (the instruction for transportation, the instruction for start-up of air-conditioning and the target temperature) to the transportation vehicle (step S215). Processing after step S215 (i.e. the processing from steps S216 to S222) is the same as the processing of steps from S203 to S209 shown in FIG. 3.

3. Effects According to the Transportation System

In the transportation system according to the second embodiment described above, the target temperature is added to the transportation information which is transmitted to the transportation vehicle. Therefore, it is possible to adjust room temperature of the transportation vehicle at the pick up to a comfortable temperature for the user.

Third Embodiment

1. Characteristic of a Third Embodiment of the Present Disclosure

In the transportation system according to the first embodiment described above, the management server 20 selects the transportation vehicle. In the third embodiment, the user selects the transportation vehicle from a list on which candidates for the transportation vehicle (hereinafter also referred to as "candidate vehicles") are arranged.

In the third embodiment, instead of performing (B) Selection processing and (C) Generation processing mentioned above, the transportation vehicle management portion 21 is configured to execute processing to extract the candidate vehicles (hereinafter also referred to as "(F) Extraction processing") and processing to generate the list to be transmitted to the mobile terminal 30 (hereinafter also referred to as "(G) Generation processing").

(F) Extraction processing is processing to extract the candidate vehicles based on the transportation request and information stored in the database of the management server 20. In (F) Extraction processing, at first, at least one unoccupied vehicle which is able to reach (ii) pickup area by (v) pickup time and also has a capacity being larger than (iv) number of prospective riders is extracted as the candidate vehicle.

(G) Generation processing is processing to generate the list including an estimated time at which the candidate vehicle reaches (ii) pickup area and an estimated value of room temperature of the candidate vehicle at (ii) pickup area (hereinafter also referred to as "estimated room temperature"). The estimated room temperature is calculated under an assumption that the air conditioner of the candidate vehicle is normally driven based on the instruction for start-up of air-conditioning. The list is arranged in order of early of the estimated time to reach (ii) pickup area or in ascending order of a difference in temperature between the estimated room temperature and the predetermined suitable temperature range. The candidate vehicles may be evaluated with a given assessment function in which the estimated time to reach (ii) pickup area and the estimated room temperature are used as variables. The candidate vehicles may be arranged in the in descending order of the assessment result. By generating such a list, it is possible to widen options of the users who receives the list.

The list may include basic charge for room temperature of the candidate vehicle. When the list includes the basic charge for room temperature of the candidate vehicle, in (G) Generation processing, the basic charge is set to a lower price as difference in temperature between the estimated room temperature and the predetermined suitable temperature range becomes small while set to a higher price as the difference in temperature becomes large. When such a basic charge is set, it may arrange the list in order of early of the estimated time to reach (ii) pickup area or in ascending order of the basic charge. By generating such a list, it is possible to widen options of the users who receives the list.

When the transportation vehicle management portion 21 set the target temperature, the estimated room temperature matches usually the target temperature. However, when (iv) desired room temperature is included in the transportation request and also (iv) desired room temperature deviates greatly from actual room temperature of the candidate vehicle, there may be a difference in temperature between the estimated room temperature and (iv) desired room temperature. Therefore, when desired room temperature is included in the transportation request, in (G) Generation processing, the basic charge is set to a lower price as the difference in temperature between the estimated room temperature and (iv) desired room temperature becomes large. When such a basic charge is set, it may arrange the list in order of early of the estimated time to reach (ii) pickup area or in ascending order of the basic charge. By generating such a list, it is possible to widen options of the users who receives the list.

2. Example of Flow of the Transportation Service

Figure 6:
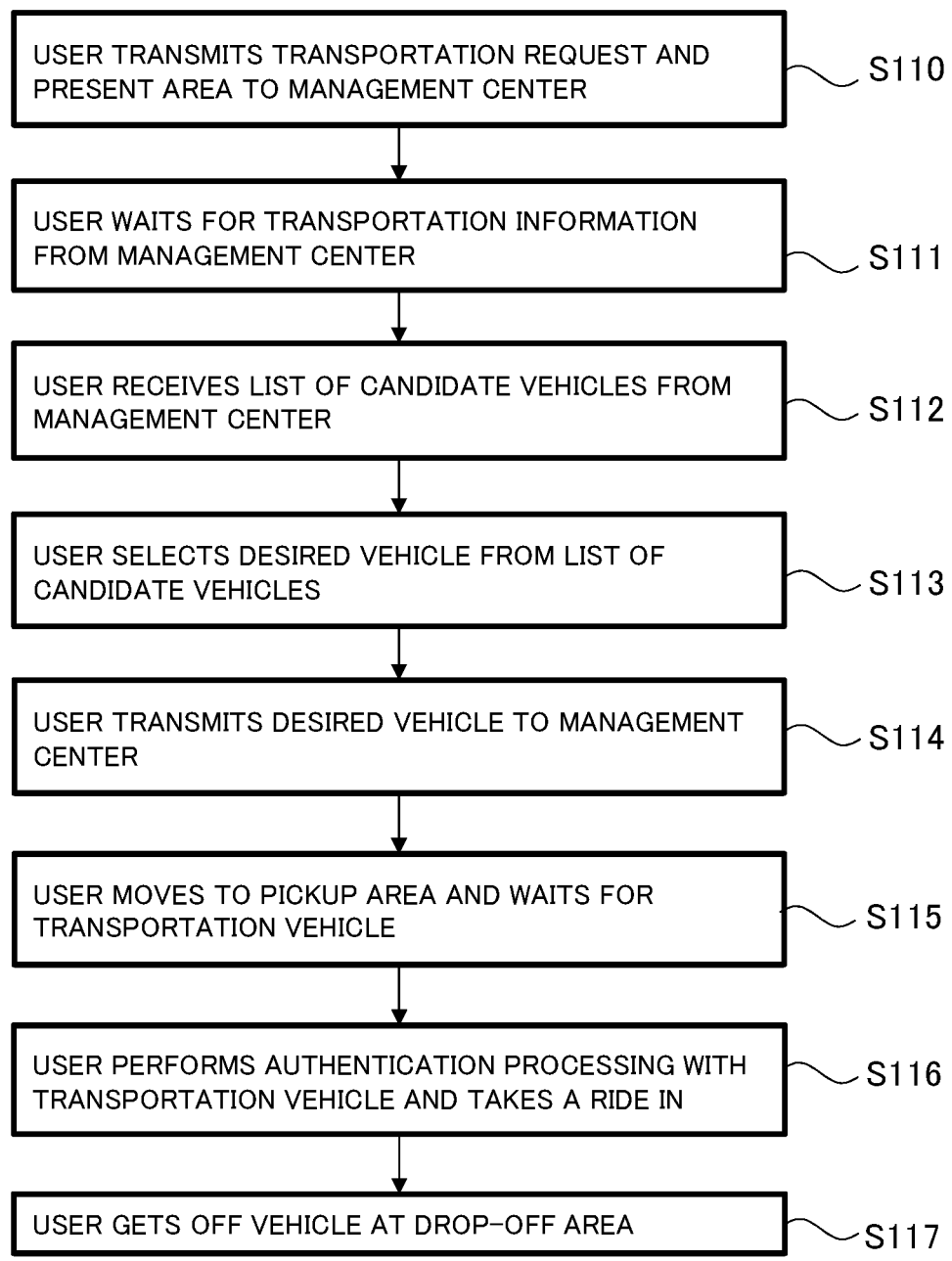
FIG. 6 is a flowchart for showing a flow of processing in the mobile terminal (the user) constituting the transportation system according to a third embodiment of the present disclosure.
Figure 7:
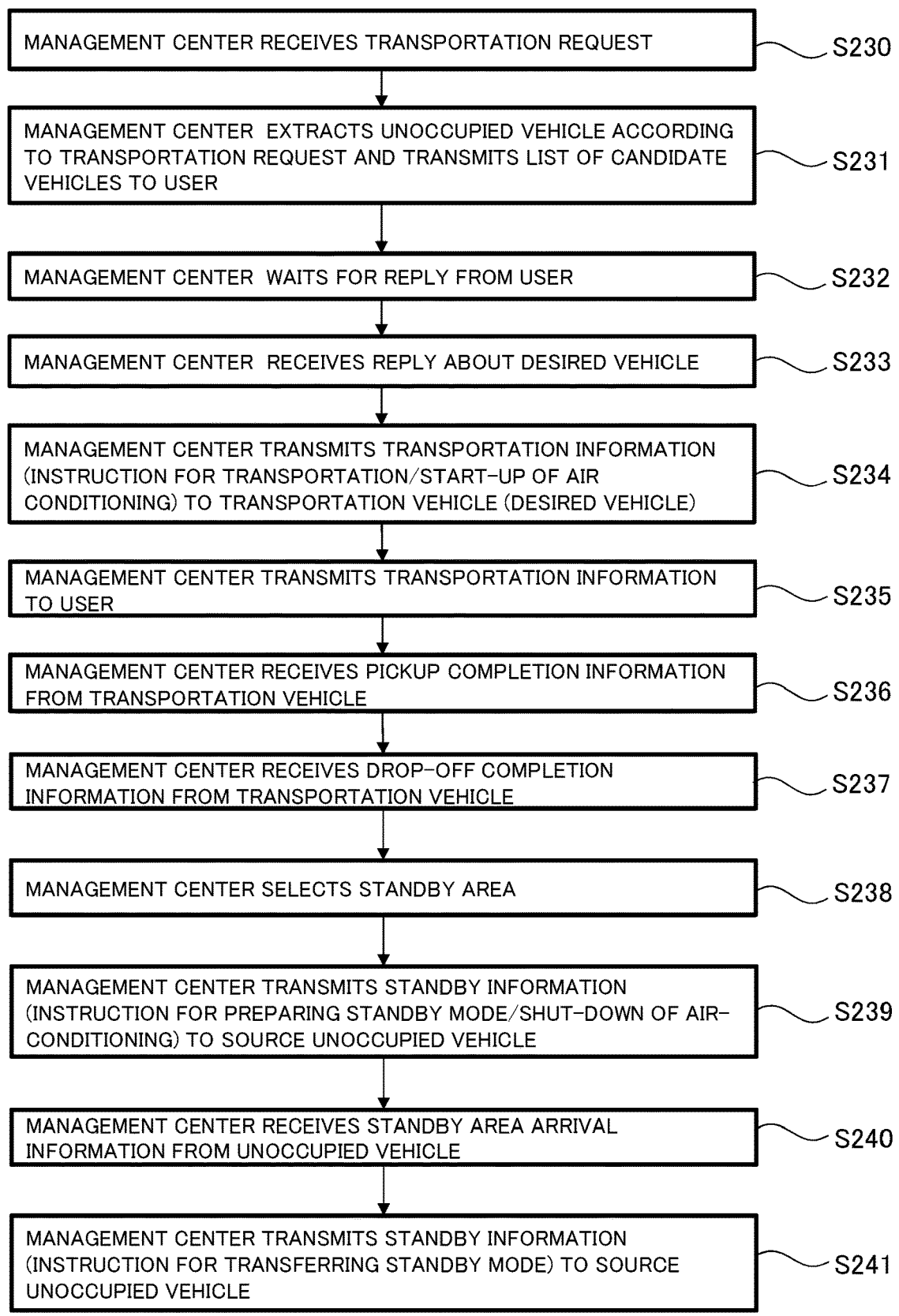
FIG. 7 is a flowchart for showing a flow of processing in the management center (the management server) constituting the transportation system according to the third embodiment.

An example of a processing flow of the transportation service according to the third embodiment will be described with reference to FIGS. 6 and 7. FIG. 6 is a flowchart for showing a flow of processing in the mobile terminal 30 (the user) constituting the transportation system 1. FIG. 7 is a flowchart for showing a flow of processing in the management center 10 (the management server 20) constituting the transportation system 1. Note that the flow of processing in the vehicle 40 is basically the same as the flow described in FIG. 4.

The processing of the transportation system shown in FIGS. 6 and 7 is started when the user starts up the application 31 and transmits the transportation request. As shown in FIG. 7, the user transmits the transportation request and present area to the management center 10 (step S110), and waits for transportation information from the management center 10 (step S111). The processing in steps S110 and S111 is the same as the processing in steps S100 and S101 shown in FIG. 1.

When the management center 10 receives the transportation request, the processing from step S231 in FIG. 7 is started. As shown in FIG. 7, when receiving the transportation request from the user (step S230), the management center 10 extracts the unoccupied vehicle according to the transportation request and transmits the list of the candidate vehicles to the user (step S231), and waits for a reply from the user about a vehicle to which the user wants to ride (hereinafter also referred to as a "desired vehicle") (step S232).

When the mobile terminal 30 receives the list of the candidate vehicles, the processing from step S112 shown in FIG. 6 is started. As shown in FIG. 6, when the user receives the list of the candidate vehicles from the management center 10 (step S112), the user selects the desired vehicle from the list (step S113) and transmits the desired vehicle to the management center 10 (step S114).

When the management center 10 receives the reply of the desired vehicle, the processing from step S233 shown in FIG. 7 is started. As shown in FIG. 7, when the management center 10 receives the reply of the desired vehicle from the user (step S233), the management center 10 transmits transportation information (the instruction for transportation and the instruction for start-up of air-conditioning) to the desired vehicle (step S234). That is, the desired vehicle is treated as the transportation vehicle. The processing in step S235 and subsequent steps (i.e. the processing from steps S235 to S241) is the same as the processing from steps S203 to S209 shown in FIG. 3.

3. Effects According to the Transportation System

In the transportation system according to the third embodiment described above, the list on which the candidate vehicles is provided to the user. Therefore it is possible for the user to select a preferable transportation vehicle by considering various conditions such as the estimated time to reach (ii) pickup area, the estimated room temperature and the basic charge for room temperature.

Fourth Embodiment

1. Characteristic of a Forth Embodiment of the Present Disclosure

In the transportation system according to the second embodiment described above, when the transportation vehicle receives transportation information (the instruction for transportation, the instruction for start-up of air-conditioning and the target temperature), the air conditioning control portion 52 executes feedforward control of the air conditioner based on the target temperature. In the fourth embodiment, start-up time of the feedforward control (hereinafter also referred to as "start-up time for air conditioning") is added to the transportation information.

In the fourth embodiment, the transportation vehicle management portion 21 is configured to add the start-up time for air conditioning to the transportation information in (C) Generation processing described above. The start-up time for air conditioning is set to the time when a scheduled time of feedforward control is subtracted from the estimated time at which the transportation vehicle reaches (ii) pickup area. The scheduled time of feedforward control is calculated, for example, based on a map in which a relationship between the actual room temperature of the transportation vehicle, the target temperature and the period to execute feedforward control.

2. Effects According to the Transportation System

In the transportation system according to the fourth embodiment described above, the start-up time for air conditioning is added to the transportation information. The scheduled time of feedforward control used for setting the start-up time for air conditioning is said to be the time required to adjust the actual room temperature to the target temperature. Therefore, according to the addition of the start-up time for air conditioning, it is possible to shorten the operation time of the air conditioner during the autonomous travel of the route from the present area to (ii) pickup area while reliably adjusting the actual room temperature. Therefore, it is possible to suppress consumption of power in the battery 44.

Fifth Embodiment 1

Characteristic of a Fifth Embodiment of the Present Disclosure

In the transportation system according to the first embodiment described above, the transportation service is performed based on the transportation request. In the firth embodiment, a hypothetical transportation service is performed based on a hypothetical transportation request.

In the fifth embodiment, the transportation vehicle management portion 21 is configured to execute processing to generate the hypothetical transportation request (hereinafter also referred to as "(H) Generation processing"), processing to select a hypothetical transportation vehicle (hereinafter also referred to as "(I) Selection processing") and processing to generate a hypothetical transportation information (hereinafter also referred to as "(J) Generation processing"), instead of executing (A) reception processing, (B) selection processing and (C) described above.

(H) Generation processing is processing to generate the hypothetical transportation request by planning for a high-needs area where there was a lot of transportation requests. In (H) Generation processing, at first, based on histories of (ii) pickup area stored in the database of the management server 20, the high-needs area in a time zone slightly ahead of the current time zone is specified. Then, when the high need area is specified, for example, the hypothetical request including the following information on (vii) and (viii) is generated.

(vii) hypothetical pickup area
(viii) hypothetical pickup time

Note that the information on (vii) hypothetical pickup area may be the specified high need area. The information on (viii) hypothetical pickup time may be an arbitrary time within a time period slightly ahead of the current time.

(I) Selection processing is processing to select at least one hypothetical transportation vehicle which engages in the transportation service in the high-needs area based on the hypothetical transportation request and information stored in the database of the management server 20. In (I) Selection processing, at first, deficiency number of the unoccupied vehicles in (vii) hypothetical pickup area is calculated. The deficiency number is calculated by subtracting number of the unoccupied vehicles which is in standby mode at (vii) hypothetical pickup area from predictable number of the unoccupied vehicles at (vii) hypothetical pickup area. Subsequently, from the unoccupied vehicles which are outside (vii) hypothetical pickup area, at least one unoccupied vehicle which is able to reach (vii) hypothetical pickup area by (viii) hypothetical pickup time is selected as the hypothetical transportation vehicle. The hypothetical transportation vehicle is selected as many as the deficiency number. The hypothetical transportation vehicle is preferably selected in order of shortest autonomous travel time of route to (vii) hypothetical pickup area.

(J) Generation processing is processing to generate hypothetical transportation information for the transmission to the hypothetical transportation vehicle. The hypothetical transportation information includes the instruction for transportation and the instruction for air-conditioning. The instruction for transportation included in the hypothetical transportation information includes, for example, (vii) hypothetical pickup area. The instruction for air-conditioning included in the hypothetical transportation information is, for example, the instruction for start-up of air-conditioning.

2. Example of Flow of the Transportation Service

Figure 8:
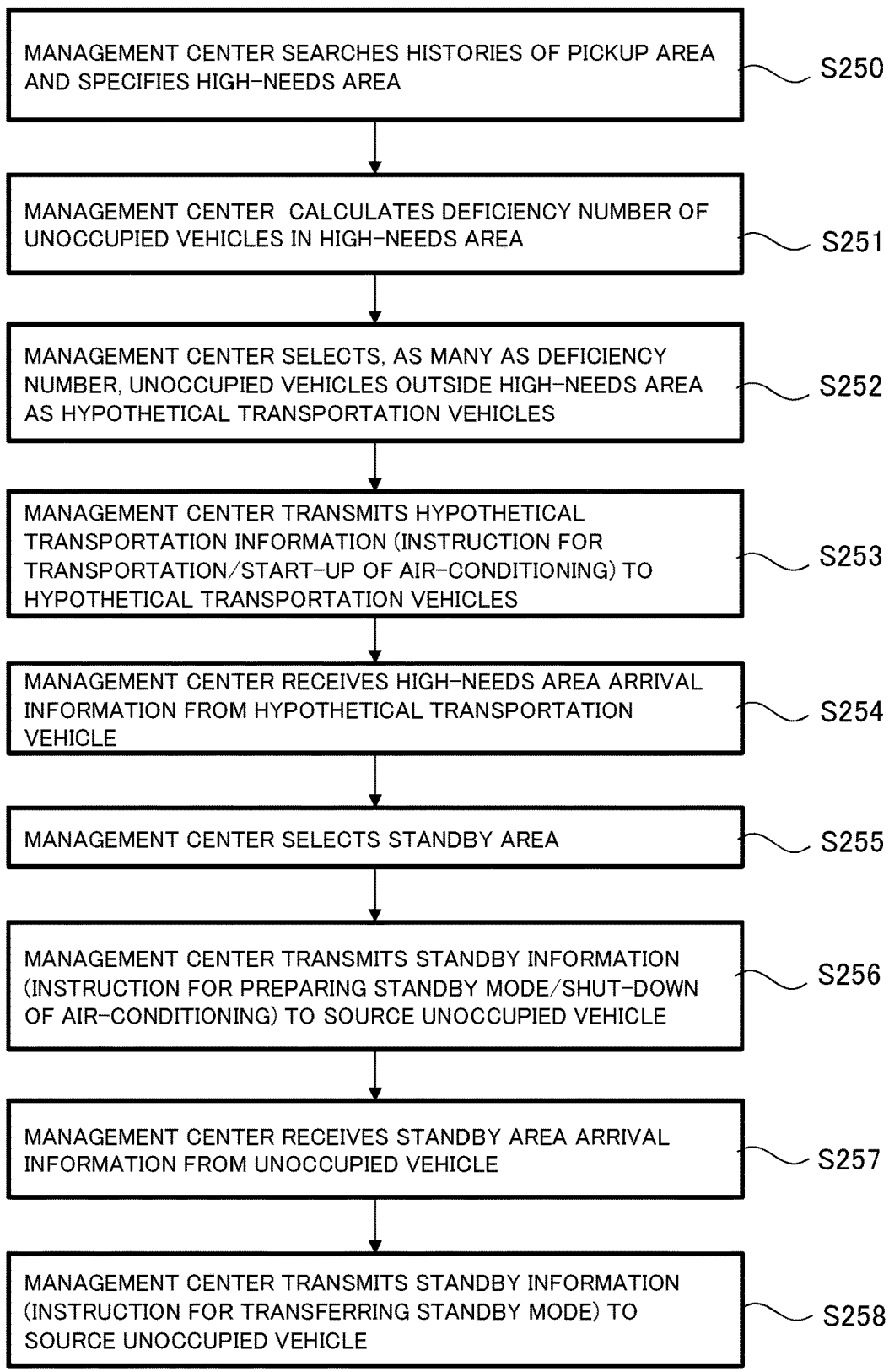
FIG. 8 is a flowchart for showing a flow of processing in the management center (the management server) constituting the transportation system according to a fifth embodiment of the present disclosure.
Figure 9:
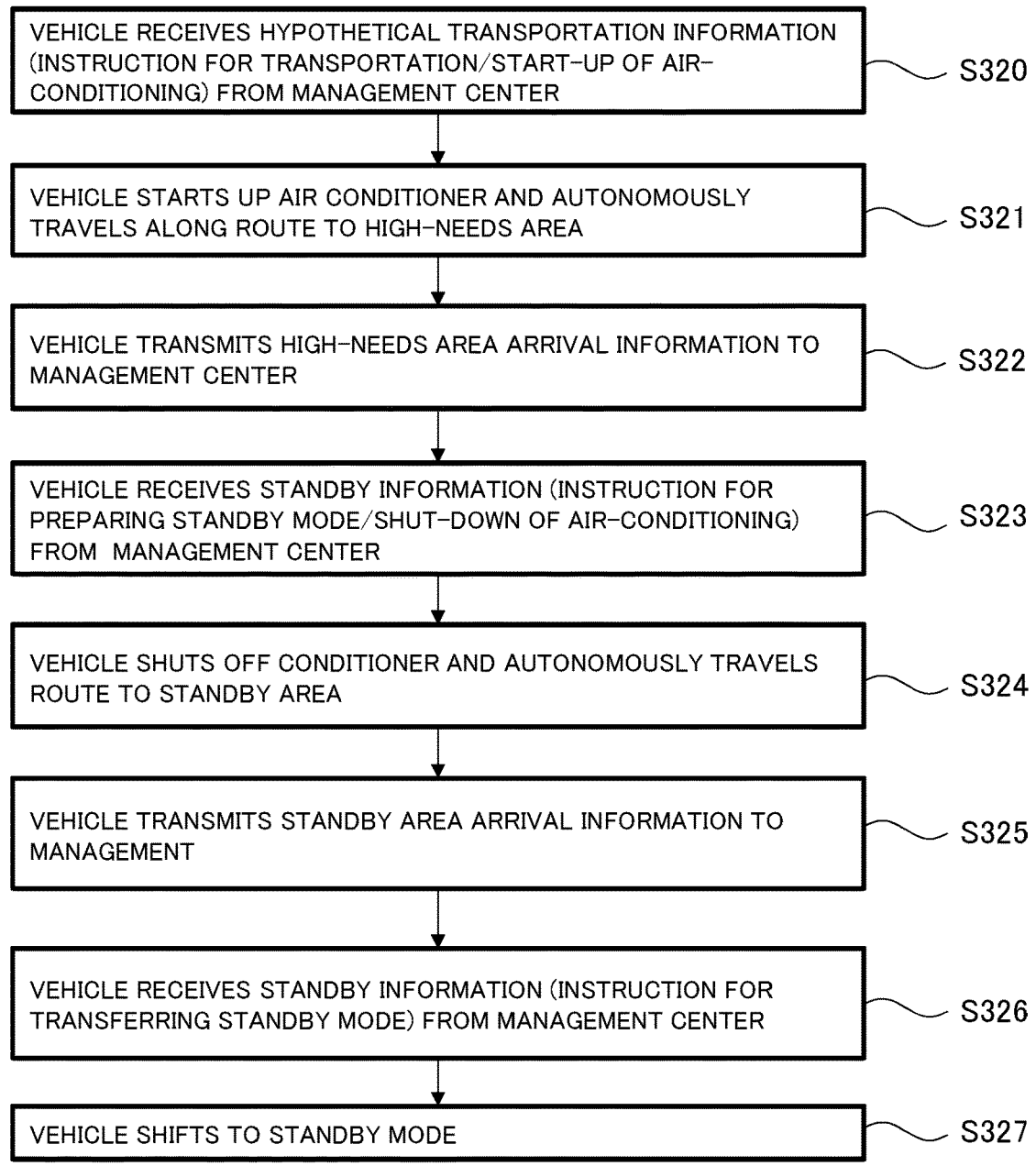
FIG. 9 is a flowchart for showing a flow of processing in the vehicle constituting the transportation system according to fifth embodiment.

An example of a processing flow of the transportation service according to the fifth embodiment will be described with reference to FIGS. 8 and 9. FIG. 8 is a flowchart for showing a flow of processing in the management center 10 (the management server 20) constituting the transportation system 1. FIG. 9 is a flowchart for showing a flow of processing in the vehicle 40 constituting the transportation system 1.

The processing of the transportation system shown in FIGS. 8 and 9 is started when the high-needs area is specified by a periodical searching on the histories of the pickup area by the management center 10. As shown in FIG. 8, when the management center 10 searches the histories of the pickup area and specifies the high-needs area (step S250), it calculates the deficiency number of the unoccupied vehicles in the high-needs area (step S251). Subsequently, the management center 10 selects, as many as the deficiency number, unoccupied vehicles outside the high-needs area as the hypothetical transportation vehicles (step S252). After the selection of the hypothetical transportation vehicles, the management center 10 transmits the hypothetical transportation information (the instruction for transportation and the instruction for start-up of air-conditioning) to the hypothetical transportation vehicles (step S253).

When the vehicle 40 receives hypothetical transportation information, the processing shown in FIG. 9 is started. As shown in FIG. 9, when the vehicle 40 (the hypothetical transportation vehicle) receives hypothetical transportation information (the instruction for transportation and the instruction for start-up of air-conditioning) from the management center 10 (step S320), it starts up the air conditioner and autonomously travels along the route to the high-needs area (step S321). Then, when the vehicle 40 (the hypothetical transportation vehicle) reaches the high-needs area, it transmits to the management center 10 arrival information to the high-needs area (step S322).

When the management center 10 receives the high-needs area arrival information, the vehicle 40 is treated as the unoccupied vehicle at the management center 10, and the processing from step S254 in FIG. 8 is started. When receiving the high-needs area arrival information from the vehicle 40 (the hypothetical transportation vehicle) (step S254), the management center 10 selects the standby area (step S255) and transmits the standby information (the instruction for preparing standby mode and the instruction for shut-down of air-conditioning) to the vehicle 40 (the hypothetical transportation vehicle) as a source unoccupied vehicle which has transmitted the high-needs area arrival information (step S256).

When the vehicle 40 (the unoccupied vehicle) receives the standby information (the instruction for preparing standby mode and the instruction for shut-down of air-conditioning), the processing from step S323 shown in FIG. 9 is started. The processing from step S323 in FIG. 9 (that is, the processing from steps S323 to S327) is the same as the processing from steps S307 to S311 in FIG. 4. Also, the processing of steps S257 and S258 of FIG. 8 which is started with the processing of step S326 of FIG. 9 is the same as the processing of steps S208 and S209 of FIG. 3 which is started with the processing of step S310 of FIG. 4.

3. Effects According to the Transportation System

In the transportation system according to the fifth embodiment described above, based on the hypothetical transportation request, at least one unoccupied vehicle (the hypothetical transportation vehicle) is arranged to the high-needs area. Therefore, it is possible to quickly respond to near future transportation request in the high-needs area. Further, according to the transportation system, the instruction for start-up of air-condition is included in the hypothetical transportation information. Therefore, the air conditioner is started up before the unoccupied vehicle reaches the high-needs area. Therefore, even in the case of handling transportation requests in the near future, it is also possible to suppress room temperature of the unoccupied vehicle at the pickup from being uncomfortable temperature for the user of the near future. In addition, according to the transportation system, the instruction for shut-down of air-conditioning is included in the standby information. Therefore, it is possible to suppress the consumption of power in the battery 44 based on the hypothetical transportation request.

Sixth Embodiment

1. Characteristic of a Sixth Embodiment of the Present Disclosure

In the transportation system according to the fifth embodiment described above, the air conditioner was continuously driven during the autonomous travel of the route from the present area to the high-needs area. In the sixth embodiment, the air conditioner is driven during the autonomous travel of the route from the present area to the high-needs area and also during decelerating travel. In other words, in the sixth embodiment, the air conditioner is driven during the autonomous travel of the route from the present area to the standby area via the high-needs area and also during the decelerating travel.

In the sixth embodiment, the transportation vehicle management portion 21 adds a condition, to the instruction for start-up of air-conditioning which is generated in (J) Generation processing described above, that the vehicle 40 (hypothetical transportation vehicle) is in decelerating travel. In addition, the communication portion 23 transmits the instruction for shut-down of air-conditioning generated in (E) Generation processing described above at the transmission of the instruction for transferring standby mode to the vehicle 40 (the hypothetical transportation vehicle), instead of the transmission of the instruction for preparing standby mode.

2. Example of Flow of the Transportation Service

Figure 10:
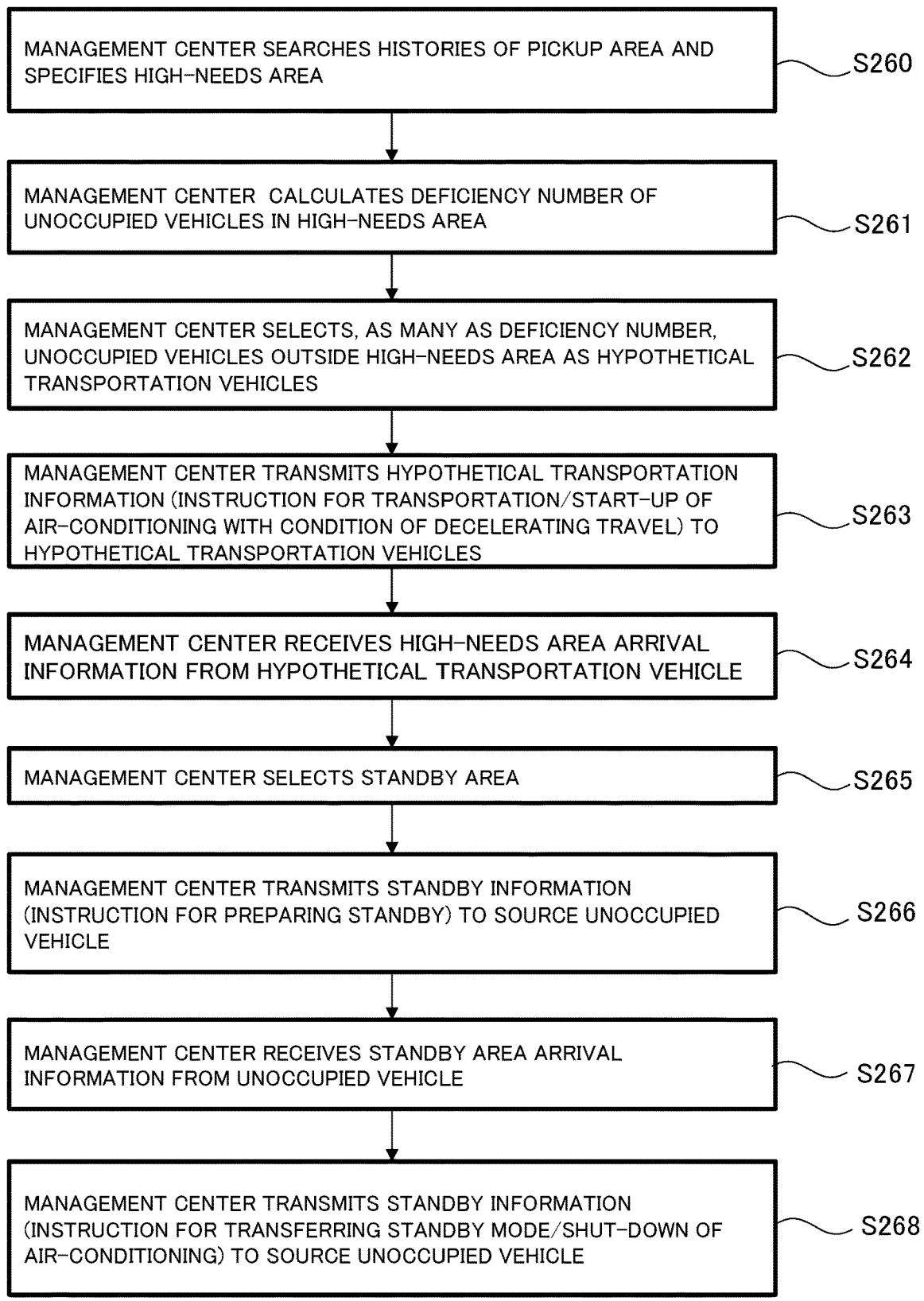
FIG. 10 is a flowchart for showing a flow of processing in the management center (the management server) constituting the transportation system according to a sixth embodiment of the present disclosure.
Figure 11:
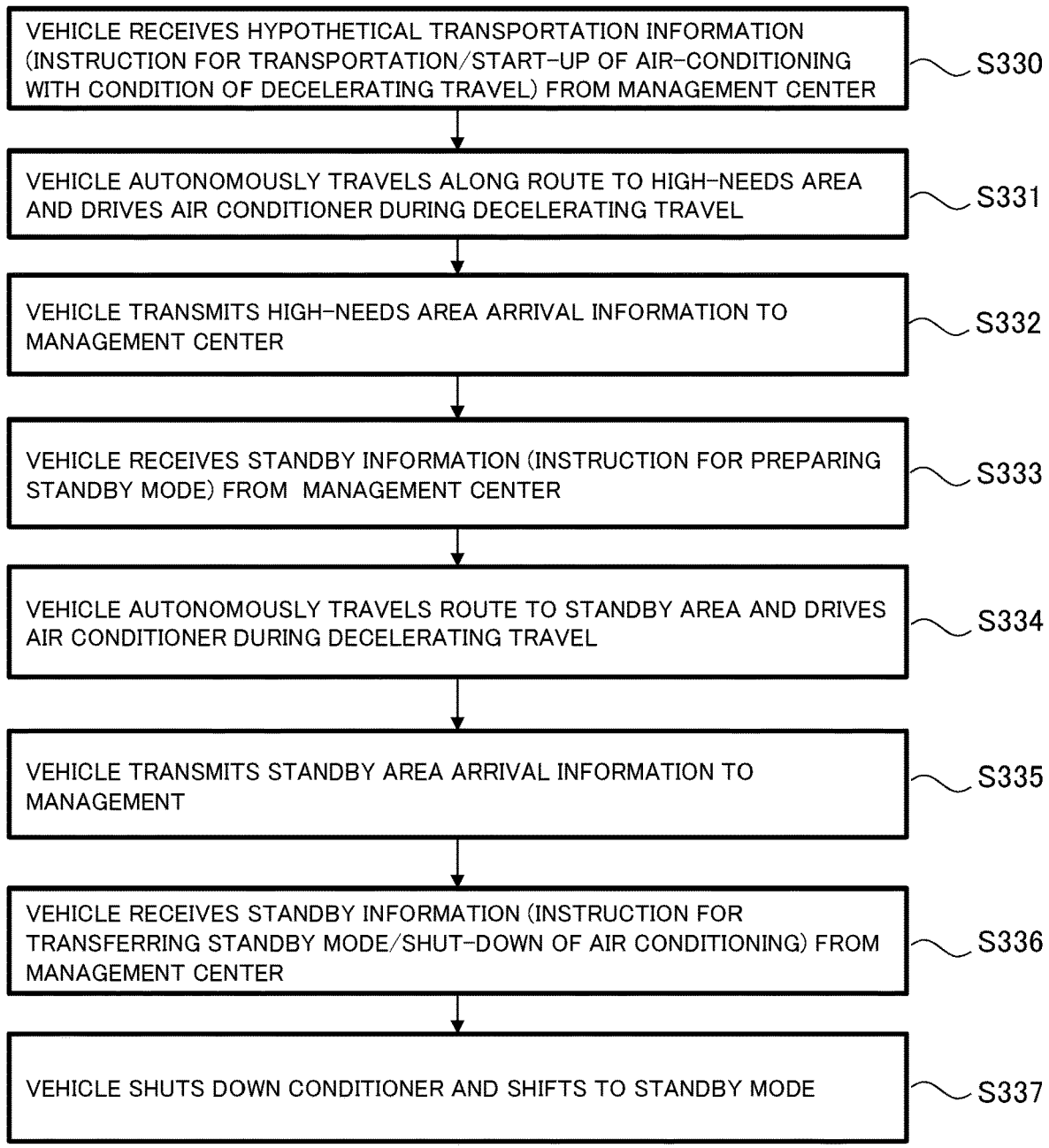
FIG. 11 is a flowchart for showing a flow of processing in the vehicle constituting the transportation system according to sixth embodiment.

An example of a processing flow of the transportation service according to the six embodiment will be described with reference to FIGS. 10 and 11. FIG. 10 is a flowchart for showing a flow of processing in the management center 10 (the management server 20) constituting the transportation system 1. FIG. 11 is a flowchart for showing a flow of processing in the vehicle 40 constituting the transportation system 1.

The processing of the transportation system shown in FIGS. 10 and 11 is started when the high-needs area is specified by a periodical searching on the histories of the pickup area by the management center 10. As shown in FIG. 10, when the management center 10 specifies the high-needs area (step S260), it calculates the deficiency number of the unoccupied vehicles in the high-needs area (step S261). Subsequently, the management center 10 selects, as many as the deficiency number, unoccupied vehicles outside the high-needs area as the hypothetical transportation vehicles (step S262). The processing of steps from S260 to S262 is the same as the processing of steps from S250 to S252 shown in FIG. 8. After the selection of the hypothetical transportation vehicles, the management center 10 transmits the hypothetical transportation information (the instruction for transportation and the instruction for start-up of air-conditioning with the condition of the decelerating travel) to the hypothetical transportation vehicles (step S263).

When the vehicle 40 receives hypothetical transportation information, the processing shown in FIG. 11 is started. As shown in FIG. 11, the vehicle 40 (the hypothetical transportation vehicle) receives the hypothetical transportation information from the management center 10 (the instruction for transportation and the instruction for start-up of air-conditioning with the condition of the decelerating travel) (step S330), it autonomously travels the route to the high-needs area and drives the air conditioner during decelerating travel (step S331). Then, when the vehicle 40 (the hypothetical transportation vehicle) reaches the high-needs area, it transmits to the management center 10 arrival information to the high-needs area (step S332).

When the management center 10 receives the high-needs area arrival information, the vehicle 40 is treated as the unoccupied vehicle at the management center 10, and the processing from step S264 in FIG. 10 is started. When receiving the high-needs area arrival information from the vehicle 40 (the hypothetical transportation vehicle) (step S264), the management center 10 selects the standby area (step S265) and transmits the standby information (the instruction for preparing standby mode) to the source unoccupied vehicle which has transmitted the high-needs area arrival information (step S266).

When the vehicle 40 (the unoccupied vehicle) receives the standby information (the instruction for preparing standby mode), the processing from step S333 shown in FIG. 11 is started. As shown in FIG. 11, when receiving the standby information (the instruction for preparing standby mode) from the management center 10 (step S333), the vehicle 40 (the unoccupied vehicle) autonomously travels to the standby area while driving the air conditioner during decelerating travel (step S334). When the vehicle 40 (the unoccupied vehicle) reaches the standby area, it transmits the standby area arrival information to the management center 10 (step S335).

When the management center 10 receives the standby area arrival information, the processing from step S267 shown in FIG. 10 is started. As shown in FIG. 10, when the management center 10 receives the standby area arrival information from the vehicle 40 (the unoccupied vehicle) (step S267), the management center 10 transmits standby information (the instruction for transferring standby mode and the instruction for shut-down of air-conditioning) to the source unoccupied vehicle which has transmitted the high-needs area arrival information (step S268).

When the vehicle 40 (the unoccupied vehicle) receives the standby information (the instruction for transferring standby mode and the instruction for shut-down of air-conditioning), the processing from step S336 shown in FIG. 11 is started. As shown in FIG. 11, when the vehicle 40 receives the standby information (the instruction for transferring standby mode and the instruction for shut-down of air-conditioning) from the management center 10 (step S336), it shuts down the air conditioner and shifts to the standby mode (step S337).

3. Effects According to the Transportation System

In the transportation system according to the sixth embodiment described above, the air conditioner is driven during the autonomous travel from the present area to the standby area and also during the decelerating travel. The arrangement of the hypothetical transportation vehicle based on the hypothetical transportation request has the risk of resulting in a missed swing. In this regard, during deceleration of the vehicle 40, the battery 44 is charged with regenerative energy by the control for regenerating described above. Therefore, it is possible to suppress consumption of power in the battery 44 due to the hypothetical transportation request.

Seventh Embodiment

1. Characteristic of a Seventh Embodiment of the Present Disclosure

In the seventh embodiment, new standby information is generated. The new standby information is transmitted to the unoccupied vehicle (hereinafter also referred to as a "standby vehicle") which is in the standby mode in the high-needs area.

In the seventh embodiment, the unoccupied vehicle management portion 22 is configured to execute processing to determine the status information of the standby vehicle (hereinafter also referred to as "(K) Determination processing"), processing to select a new standby area of the standby vehicle (hereinafter also referred to as "(L) Selection processing") and processing to generate the new standby information to be transmitted to the standby vehicle (hereinafter also referred to as "(M) Generation processing").

(K) Determination processing is processing to determine whether or not room temperature of the standby vehicle is higher than the predetermined suitable temperature range and also determine whether or not standby area of the same standby vehicle matches a sunny area ("sunny area" is defined as an area with direct sunlight). The determination as to whether room temperature of the standby vehicle is higher than the predetermined suitable temperature range is performed based on information stored in the database of the management server 20 (specifically, the actual room temperature). The determination as to whether or not the standby area matches the sunny area is performed based on information stored in the database of the management server 20 (specifically, standby area information, map information and environmental information).

(L) Selection processing is processing to select a shadow area ("shadow area" is defined as an area without direct sunlight) as a new standby area when it is determined in (K) Determination processing that room temperature of the standby vehicle is higher than the predetermined suitable temperature range and also the standby area matches the sunny area. In (L) Selection processing, at first, an area where the standby vehicle is able to reach in the shortest time from present area is extracted from standby areas at which the vehicles 40 able to stop. Subsequently, it is determined whether or not the extracted area matches the shadow area. When it is determined that the extracted area matches the shadow area, it is selected as the new standby area. When it is determined that the extracted area does not match the shadow area, an area where the standby vehicle is able to reach in the second shortest time from present area is extracted. Then, a determination is executed as to whether or not the extracted area matches the shadow area. By repeating such the extraction and determination, the new standby area is selected.

(M) Generation processing is processing to generate the new standby information to be transmitted to the standby vehicle in accordance with determination result in (K) Determination processing. When the determination result in (K) Determination is positive, an instruction for preparing standby mode, an instruction for transferring standby mode, an instruction for air-conditioning and an instruction for air-conditioning are included in the new standby information. The instruction for preparation standby mode includes, for example, information on the new standby area. The instruction for transferring standby mode is an instruction to be transmitted to the standby vehicle which has moved to the new standby area. The instruction for air-conditioning includes, for example, the instruction for start-up of air-conditioning and the target temperature. When the determination result in (K) Determination is negative, an instruction for transferring standby mode and an instruction for air-conditioning are included in the new standby information. In other words, when the determination result in (K) Determination is negative, the instruction for preparing standby mode is not included in the new standby information.

When the instruction for start-up of air-conditioning and the target temperature are included in the new standby information, the air conditioning control portion 52 executes feedback control of the air conditioner such that room temperature of the standby vehicle matches the target temperature. The air conditioning control portion 52 may execute feedforward control of the air conditioner based on room temperature of the standby vehicle and the target temperature. Note that the target temperature is set to a temperature within the predetermined suitable temperature range.

2. Example of Flow of the Transportation Service

Figure 12:
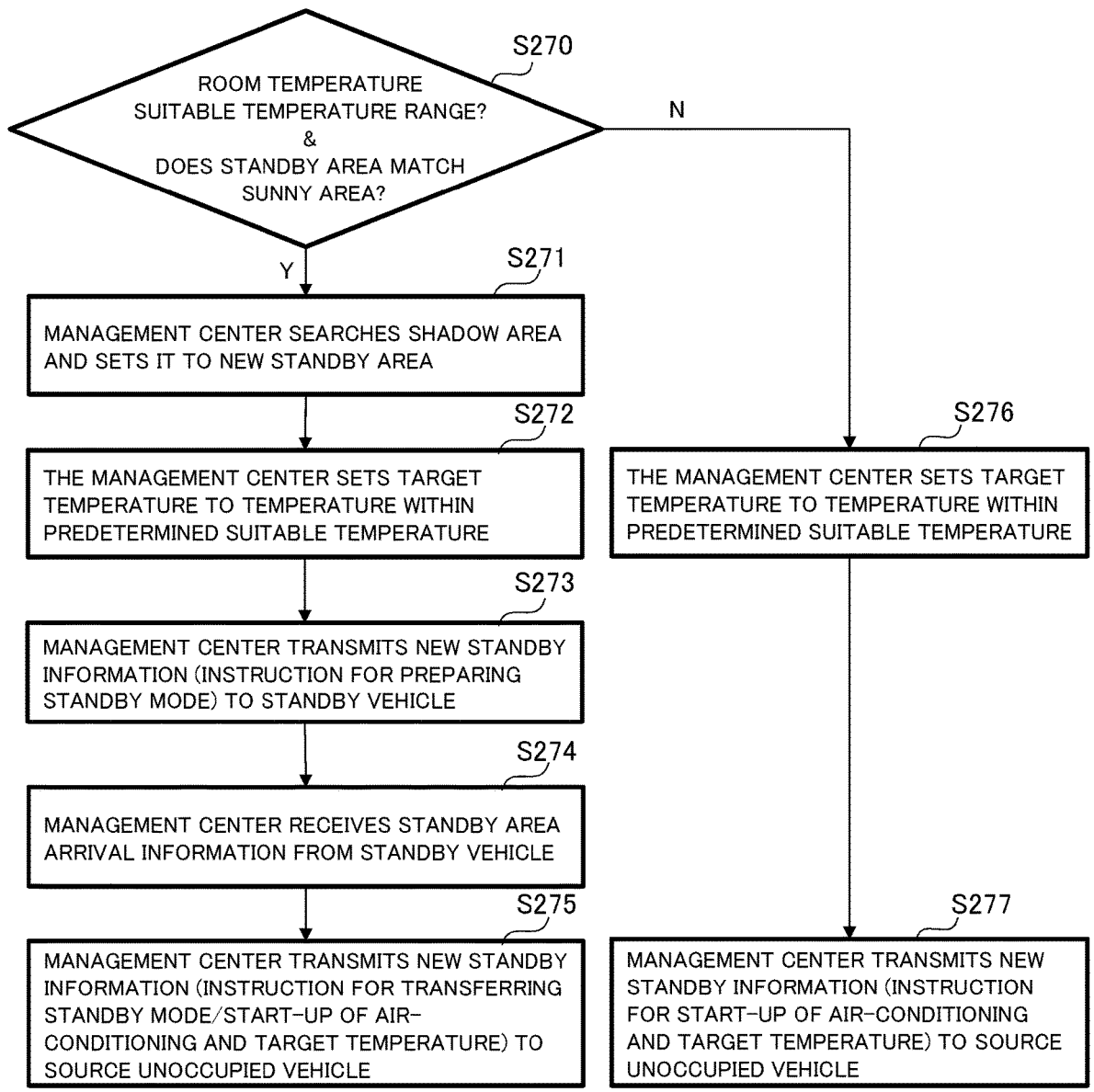
FIG. 12 is a flowchart for showing a flow of processing in the management center (the management server) constituting the transportation system according to a seventh embodiment of the present disclosure.

An example of a processing flow of the transportation service according to the seventh embodiment will be described with reference to FIG. 12. FIG. 12 is a flowchart for showing a flow of processing in the management center 10 (the management server 20) constituting the transportation system 1. Note that the flow of processing in the mobile terminal 30 (the user) is basically the same as the flow described in FIG. 2, and the flow of processing in the vehicle 40 is basically the same as the flow described in FIG. 4.

The processing of the transportation system shown in FIG. 12 is started when it is determined by the management center 10 that the unoccupied vehicle (i.e. the standby vehicle) is in the high-needs area. As shown in FIG. 12, the management center 10 determines whether or not room temperature of the vehicle 40 (the standby vehicle) is higher than the predetermined suitable temperature range and also the standby area of the vehicle 40 (the standby vehicle) matches the sunny area (step S270).

When the determination result of step S270 is positive, the management center 10 searches the shadow area and sets it to the new standby area (step S271). Also, the management center 10 sets the target temperature to a temperature within the predetermined suitable temperature range (step S272) and transmits the new standby information (the instruction for preparing standby mode) to the vehicle 40 (the standby vehicle) (step S273). Then, when the management center 10 receives standby area arrival information from the vehicle 40 (the standby vehicle) (step S274), it transmits the new standby information (the instruction for transferring standby mode, the instruction for start-up of air-conditioning and the target temperature) to the source unoccupied vehicle which has transmitted the standby area arrival information (step S275).

When the determination result of step S270 is negative, the management center 10 sets the target temperature to a temperature within the predetermined suitable temperature range (step S276), and transmits the new standby information (the instruction for start-up of air-conditioning and the target temperature) to the source unoccupied vehicle which has transmitted the standby area arrival information (step S277).

3. Effects According to the Transportation System

In the transportation system according to the seventh embodiment described above, feedback control of the air conditioner of the vehicle 40 (standby vehicle) is executed based on the instruction for start-up of air-conditioning and the target temperature included in the new standby information. Therefore, even when coping with the transportation request in the near future in the high-needs area, it is possible to avoid room temperature at the pickup in the near future from being uncomfortable temperature for the user.

In the transportation system according to the seventh embodiment described above, when the determination result of the status information of the standby vehicle is positive, the standby area of the standby vehicle is changed to the shadow area. The standby at the high-needs area has the risk of resulting in a missed swing. In this regard, when the new standby area is changed to the shadow area, room temperature of the standby vehicle tends to fall as compared to the case where the standby area is the sunny area. Therefore, it is possible to suppress the consumption of power in the battery 44 due to the operation of the air conditioner.

If the standby vehicle moves to the shadow area, there is a possibility that the room temperature falls to the predetermined suitable temperature range before the operation of the air conditioner. Therefore, when the standby area arrival information is received from the vehicle 40 (the standby vehicle), it is desirable to determine again whether or not room temperature of the standby vehicle is higher than the predetermined suitable temperature range. And, when the determination result is positive, it is desirable that the management center 10 transmits the new standby information (the instruction for transferring standby mode, the instruction for start-up of air-conditioning and the target temperature) to the source vehicle which has transmitted the standby area arrival information. By making the determination on room temperature of the standby vehicle again, it is possible to stop operating the air conditioner in the shadow area when the determination result is negative. Therefore, it is possible to suppress furthermore the consumption of power in the battery 44.

Eighth Embodiment

1. Characteristic of an eighth embodiment of the present disclosure

In the transportation system according to the seventh embodiment described above, in (L) Selection processing, when the determination result of (K) Determination processing is positive, the shadow area is set as the new standby area of the standby vehicle. In the eight embodiment, a determination opposite to the determination in (K) Determination processing is performed and a new standby area is set.

In the eight embodiment, the unoccupied vehicle management portion 22 is configured to execute processing to determine the status information of the standby vehicle (hereinafter also referred to as "(N) Determination processing"), processing to select a new standby area of the standby vehicle (hereinafter also referred to as "(O) Selection processing") and processing to generate the new standby information to be transmitted to the standby vehicle (hereinafter also referred to as "(P) Generation processing").

(N) Determination processing is processing to determine whether or not room temperature of the standby vehicle is lower than the predetermined suitable temperature range and also determine whether or not standby area of the same standby vehicle matches the shadow area. The processing in (N) Determination processing is basically the same as the processing in (K) Determination processing described above.

(O) Selection processing is processing to select the sunny area as a new standby area when it is determined in (N) Determination processing that room temperature of the standby vehicle is lower than the predetermined suitable temperature range and also the standby area matches the shadow area. The processing in (O) Selection processing is basically the same as the processing in (L) Selection processing described above.

(P) Generation processing is processing to generate the new standby information to be transmitted to the standby vehicle in accordance with determination result in (N) Determination processing. The processing in (P) Generation processing is basically the same as the processing in (M) Selection processing described above.

2. Effects According to the Transportation System

In the transportation system according to the seventh embodiment described above, when the determination result of the status information of the standby vehicle is positive, the standby area of the standby vehicle is changed to the sunny area. The standby at the high-needs area has the risk of resulting in a missed swing. In this regard, when the new standby area is changed to the sunny area, room temperature of the standby vehicle tends to rise as compared to the case where the standby area is the shadow area. Therefore, it is possible to suppress the consumption of power in the battery 44 due to the operation of the air conditioner.

If the standby vehicle moves to the sunny area, there is a possibility that the room temperature rises to the predetermined suitable temperature range before the operation of the air conditioner. Therefore, when the standby area arrival information is received from the vehicle 40 (the standby vehicle), it is desirable to determine again whether or not room temperature of the standby vehicle is lower than the predetermined suitable temperature range. And, when the determination result is positive, it is desirable that the management center 10 transmits the new standby information (the instruction for transferring standby mode, the instruction for start-up of air-conditioning and the target temperature) to the source vehicle which has transmitted the standby area arrival information. By making the determination on room temperature of the standby vehicle again, it is possible to stop operating the air conditioner in the sunny area when the determination result is negative. Therefore, it is possible to suppress furthermore the consumption of power in the battery 44.

Other Embodiments

The transportation system according to each of the embodiments described above may be modified as follows.

For example, face authentication by a camera sensor may be used as a method for user authentication. Specifically, a face picture of the user photographed with the camera sensor of the mobile terminal 30 is transmitted to the management center 10 at an admission to the transportation service and the face picture is registered in the database of the management server 20. Then, when the user uses the transportation service, the facial photograph data is added to the transportation information which is transmitted to the vehicle (the transportation vehicle) by the management center 10. The user authentication portion 54 collates a photograph of a person in the vicinity of the vehicle 40 photographed by the camera sensor of the vehicle 40 with the facial photograph data from the management server 20. And if the photograph matches the facial photograph data, the user authentication portion 54 recognizes the person as the user who has transmitted the transportation request.

As another method of user authentication, authentication using proximity wireless communication such as FeliCa (registered trademark) or NFC may be used. In this case, the mobile terminal 30 has a proximity wireless communication function or a dedicated IC card, and the vehicle 40 (the transportation vehicle) has a communication device for proximity wireless communication outside the vehicle 40. The user authentication portion 54 collates ID information of the mobile terminal 30 obtained from the management server 20 with ID information directly obtained from the mobile terminal 30 or the from the IC card by the proximity wireless communication. If ID information from the management server 20 matches the ID information from the mobile terminal 30 or the IC card, the user authentication portion 54 recognizes the person who has the mobile terminal 30 or the IC card as the user who has transmitted the transportation request.

What is claimed is:

1. A transportation system comprising:
a plurality of autonomous vehicles, each of which comprises an air conditioner;
a mobile terminal belonging to a user; and
a management center which communicates via a network to the autonomous vehicles and the mobile terminal,
wherein the management center is configured to:
based on receiving a transportation request including a pickup area from the mobile terminal, select an unoccupied vehicle from the autonomous vehicles as a transportation vehicle;
transmit to the transportation vehicle an instruction for transportation based on the transportation request and an instruction for start-up of the air conditioner; and
based on receiving from the transportation vehicle a drop-off completion information of the user according to the instruction for transportation, transmit to the transportation vehicle an instruction for shutdown of the air conditioner,
wherein the management center is further configured to obtain environmental information of the pickup area,
wherein the management center is further configured to obtain GPS information of the mobile terminal,
wherein the management center is further configured to estimate whether the mobile terminal is indoors or outdoors based on the GPS information,
wherein the management center is further configured to transmit a target value of a room temperature of the transportation vehicle at the transmission of the instruction for start-up, and
wherein the management center is further configured to set the target value based on the environmental information, and based on estimating whether the mobile terminal is indoors or outdoors,
wherein the management center is further configured to:
estimate a travel time to reach the pickup area;
set a start-up time of the air conditioner by subtracting a required time for adjusting room temperature of the transportation vehicle to the target value from the estimated travel time for the transportation vehicle to reach the pickup area; and
transmit the start-up time of the air conditioner to the transportation vehicle with the transmission of the instruction for the start-up of the air conditioner.

2. A transportation system comprising:
a plurality of autonomous vehicles, each of which comprises an air conditioner;
a mobile terminal belonging to a user; and
a management center which communicates via a network to the autonomous vehicles and the mobile terminal,
wherein the management center is configured to:
based on receiving a transportation request including a pickup area from the mobile terminal, select an unoccupied vehicle from the autonomous vehicles as a transportation vehicle;,
transmit to the transportation vehicle an instruction for transportation based on the transportation request and an instruction for start-up of the air conditioner; and
based on receiving from the transportation vehicle a drop-off completion information of the user according to the instruction for transportation, transmit to the transportation vehicle an instruction for shutdown of the air conditioner,
wherein the transportation request includes a desired value of a room temperature of the transportation vehicle,
wherein the management center is further configured to:
store histories of room temperature of the autonomous vehicles in association with user ID information;
obtain environmental information of the pickup area; and
obtain GPS information of the mobile terminal,
wherein the management center is further configured to transmit a target value of the room temperature of the transportation vehicle at the transmission of the instruction for start-up, and
wherein the management center is further configured to set the target value by modifying the desired value based on at least one of a history of room temperature in association with user ID information of a source mobile terminal of the transportation request, the environmental information and the GPS information,
wherein the management center is further configured to:
estimate a travel time to reach the pickup area;
set a start-up time of the air conditioner by subtracting a required time for adjusting room temperature of the transportation vehicle to the target value from the estimated travel time for the transportation vehicle to reach the pickup area; and
transmit the start-up time of the air conditioner to the transportation vehicle with the transmission of the instruction for the start-up of the air conditioner.

* * * * *